United States Patent [19]

Kashihara

[11] Patent Number: 5,742,317
[45] Date of Patent: Apr. 21, 1998

[54] IMAGE PROCESSING APPARATUS AND RECORDING APPARATUS

[75] Inventor: Atsushi Kashihara, Hachioji, Japan

[73] Assignee: Cannon Kabushiki Kaisha, Tokyo, Japan

[21] Appl. No.: 12,634

[22] Filed: Feb. 3, 1993

[30] Foreign Application Priority Data

Feb. 4, 1992 [JP] Japan ................................ 4-018969
Nov. 12, 1992 [JP] Japan ................................ 4-302540

[51] Int. Cl.$^6$ ...................... B41J 2/385; G03G 13/04; H04N 1/21; H04N 1/40
[52] U.S. Cl. ...................... 347/131; 358/298; 358/457
[58] Field of Search ...................... 358/298, 429, 358/457; 347/119, 19, 23, 14, 900, 131

[56] References Cited

U.S. PATENT DOCUMENTS

| | | | |
|---|---|---|---|
| 4,437,122 | 3/1984 | Walsh et al. | 358/458 |
| 4,841,375 | 6/1989 | Nakajima et al. | 358/466 |
| 4,847,641 | 7/1989 | Tung | 347/131 |
| 5,101,283 | 3/1992 | Seki et al. | 358/298 |

FOREIGN PATENT DOCUMENTS

| | | |
|---|---|---|
| 356224 | 2/1990 | European Pat. Off. |
| 467598 | 1/1992 | European Pat. Off. |
| 2-60764 | 3/1990 | Japan. |

Primary Examiner—Benjamin R. Fuller
Assistant Examiner—Raquel Yvette Gordon
Attorney, Agent, or Firm—Fitzpatrick, Cella, Harper & Scinto

[57] ABSTRACT

A recording apparatus of the electrophotographic system such as a laser beam printer is provided. An image processing apparatus which is connected between a recording control section and a recording mechanism section of such a recording apparatus is also provided. The apparatus comprises: an input unit for inputting image information of a density lower than a recording density of the recording mechanism section produced by the recording control section; a memory to store the image information supplied from the input unit by an amount of a plurality of main scan lines; a referring circuit to refer to the image information of a target pixel as a recording pixel and its peripheral pixels from the image information group stored in the memory; a detector to detect that the recording pixel and its peripheral pixels form a part of a predetermined half tone pattern which is constructed by a plurality of pixels as a result of the reference by the referring circuit; a converter to convert the image information of the recording pixel into the image information of a density which is at least equal to or larger than a recording density of the recording mechanism section in accordance with the result of the detection by the detector; and a transmitting circuit to transmit the image information converted by the converter to the recording mechanism section.

16 Claims, 27 Drawing Sheets

FIG. 3
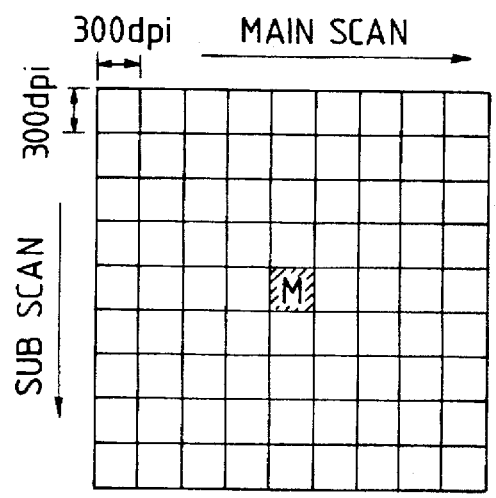
FIG. 4
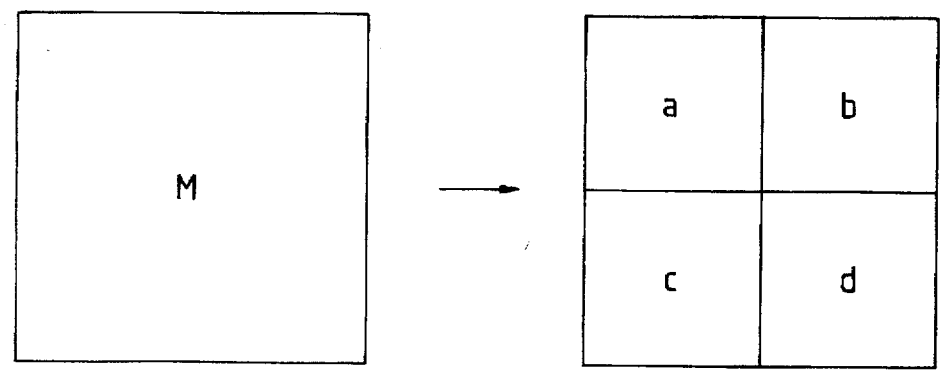
FIG. 5
| 14 | 10 | 6  | 15 |
|----|----|----|----|
| 5  | 1  | 2  | 11 |
| 9  | 4  | 3  | 7  |
| 13 | 8  | 12 | 16 |

FIG. 14A  FIG. 14B  FIG. 14C
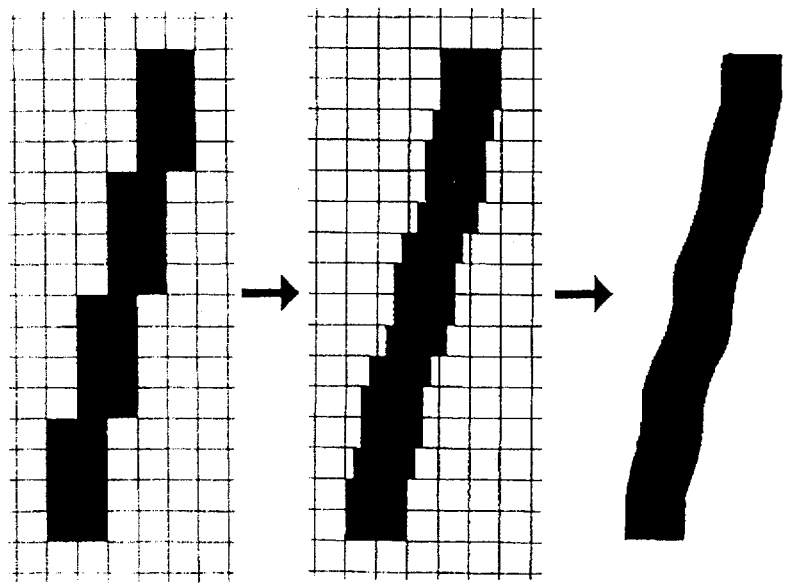
FIG. 15A
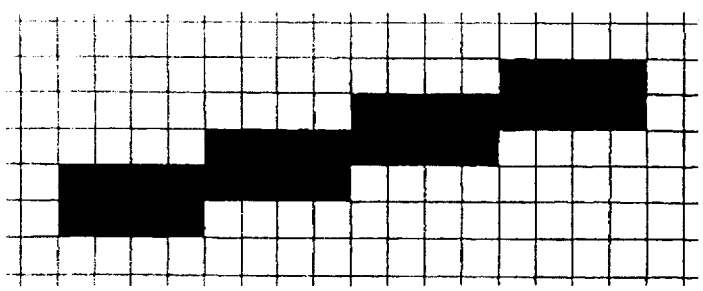
FIG. 15B
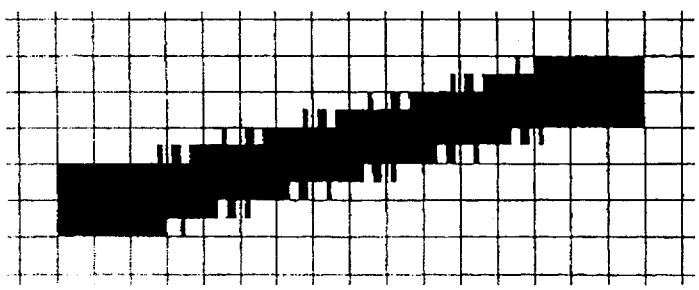
FIG. 15C
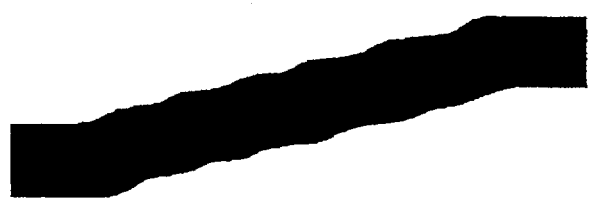

FIG. 19

| 53 | 37 | 21 | 57 | 55 | 39 | 23 | 59 |
|----|----|----|----|----|----|----|----|
| 17 | 1  | 5  | 41 | 19 | 3  | 7  | 43 |
| 33 | 13 | 9  | 25 | 35 | 15 | 11 | 27 |
| 49 | 29 | 45 | 61 | 51 | 31 | 47 | 63 |
| 56 | 40 | 24 | 60 | 54 | 38 | 22 | 58 |
| 20 | 4  | 8  | 44 | 18 | 2  | 6  | 42 |
| 36 | 16 | 12 | 28 | 34 | 14 | 10 | 26 |
| 52 | 32 | 48 | 64 | 50 | 30 | 46 | 62 |

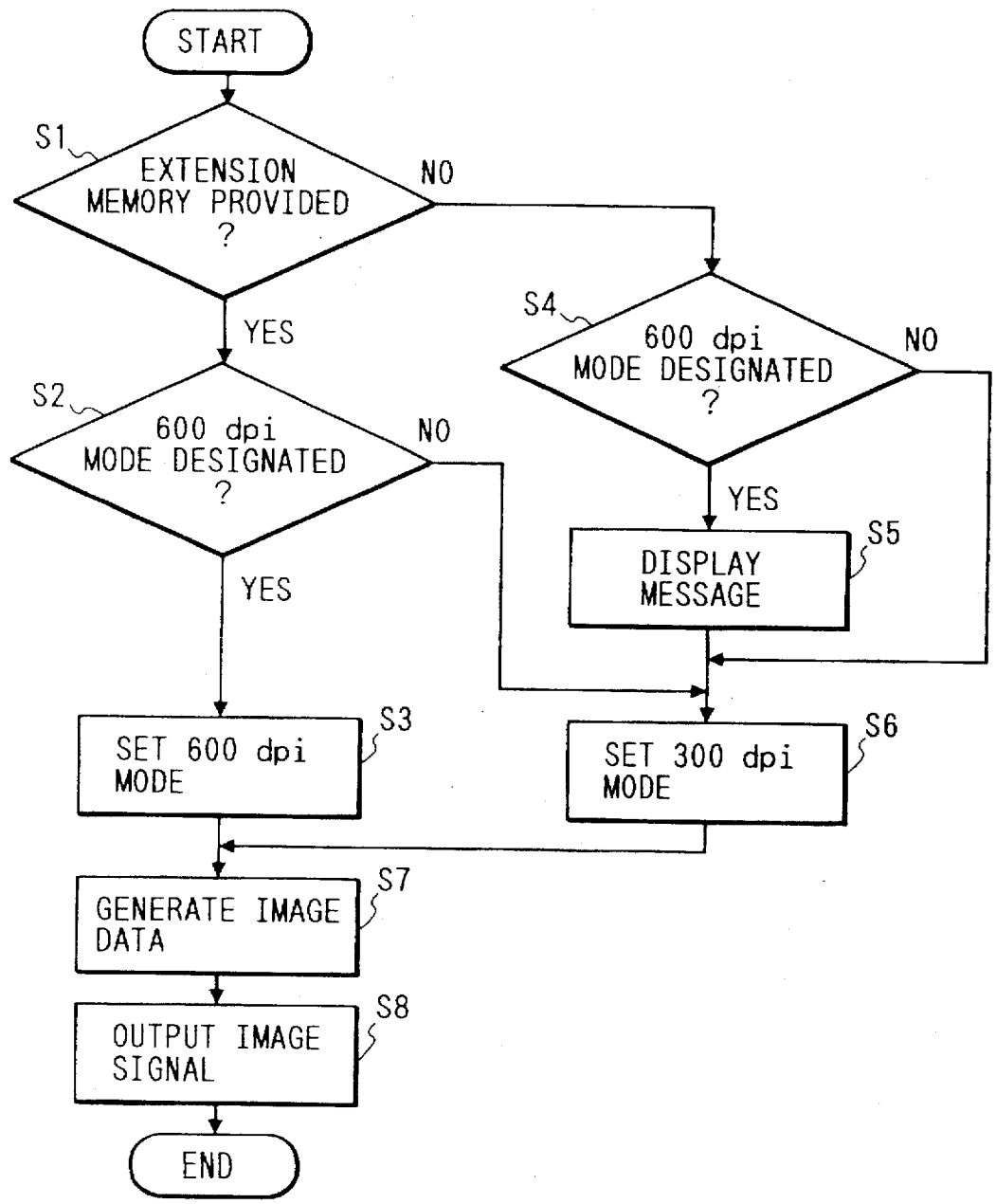

IMAGE PROCESSING APPARATUS AND RECORDING APPARATUS

BACKGROUND OF THE INVENTION

1. Field of the Invention

The present invention relates to a recording apparatus of an electrophotographic system such as a laser beam printer or the like or to an image processing apparatus which is connected between a recording control section and a recording mechanism section of a recording apparatus.

2. Related Background Art

In recent years, a laser beam is widely used as an output apparatus of a computer. Particularly, a small laser beam printer having a resolution of about 300 dpi (dots per inch) is widely rapidly being spread owing to advantages such as low price and compact size.

As shown in FIG. 33, the laser beam printer comprises a printer engine unit 201 (hereinafter, also simply referred to as a printer) to actually print image data onto a photosensitive drum on the basis of dot data and a printer controller 202 connected to the printer engine unit 201. The printer controller 202 receives code data which is sent from an external host computer 203 and generates page information consisting of dot data (bit map data) on the basis of the code data and sequentially transmits the dot data to the printer engine unit 201. The host computer 203 loads a program from a floppy disk 204 having an application software and activates the application software and functions as, for example, a word processor.

FIGS. 34 and 35 are diagrams showing an engine unit of the laser beam printer. In the diagrams, reference numeral 101 denotes a paper as a recording medium; 102 a paper cassette to hold the papers 101; and 103 a paper feed cam for separating only top one of the papers 101 stacked on the paper cassette 102 and for conveying the separated paper by driving means (not shown) until the front edge portion of the paper reaches the positions of paper feed rollers 104 and 104'. The cam 103 is intermittently rotated every paper feeding operation and feeds one sheet of paper in correspondence to one rotation of the cam.

Reference numeral 118 denotes a reflecting type photosensor. The photosensor 118 detects the reflected light of the paper 101 through a hole portion 119 formed in the bottom portion of the paper cassette 102, thereby detecting the absence of the paper.

When the paper is conveyed to the roller portion by the feed cam 103, the feed rollers 104 and 104' rotate while slightly depressing the paper 101, thereby conveying the paper 101. When the paper 101 is conveyed and the front edge portion reaches the position of a resist shutter 105, the conveyance of the paper 101 is stopped by the resist shutter and the feed rollers 104 and 104' generate conveying torques and continuously rotate while slipping for the paper 101. In this case, by driving a resist solenoid 106, the resist shutter 105 is released upward, so that the paper 101 is sent to conveying rollers 107 and 107'. The resist shutter 105 is driven at a timing synchronized with the transmission timing of an image which is formed on a photosensitive drum 111 by a laser beam 120. Reference numeral 121 denotes a photosensor which is used to judge whether the paper 101 exists at the position of the resist shutter 105 or not.

Reference numeral 152 denotes a rotary polygon mirror which is driven by a motor 153. A laser driver 150 drives a semiconductor laser 151 in accordance with dot data which is sent from a character generator (not shown) to produce bit data.

The laser beam 120 emitted from the semiconductor laser 151 which is driven by the laser driver 150 is scanned in the main scan direction by the rotary polygon mirror 152 and passes through an f-θ lens 156 arranged between the rotary polygon mirror 152 and a reflecting mirror 154 and is led onto the photosensitive drum 111 through the reflecting mirror 154. Thus, an image is formed on the drum 111. The laser beam scans in the main scan direction and forms a latent image on a main scan line 157.

In this case, on the assumption that a printing density is set to 300 dpi and a printing speed is set to eight papers per minute (the A4 size or letter size), a lighting-on time of the laser to record one dot is equal to about 540 nanoseconds.

On the assumption that the printing density is set to 600 dpi and the printing speed is set to eight papers per minute (the A4 size or letter size), a lighting-on time of the laser to record one dot is equal to about 540 nanoseconds.

A beam detector 155 is arranged at the scan start position of the laser beam 120 and detects the laser beam 120, thereby detecting a BD signal as a sync signal to decide an image write timing in the main scan.

After that, the paper 101 gets a conveying torque by the conveying rollers 107 and 107' in place of the paper feed rollers 104 and 104' and is sent to the photosensitive drum 111. The drum 111 is rotated by a main motor (not shown) through a gear unit (not shown). The surface of the drum 111 is charged by a charging device 113 and a latent image is formed onto the drum surface by the exposure of the laser beam 120. The latent image at the portion exposed by the laser beam is developed as a toner image by a developing device 114. After that, the toner image is transferred onto the surface of the paper 101 by a copy transfer charging device 115. A cleaner 112 cleans the drum surface after the toner image was transferred onto the paper 101.

The toner image transferred on the paper 101 is subsequently fixed by fixing rollers 108 and 108'. After that, the paper is delivered onto a paper delivery tray 110 by delivery rollers 109 and 109'.

Reference numeral 116 denotes a paper feed base plate which can not only feed copy papers from the paper cassette 102 but also feed the papers one sheet by one from the paper feed base plate 116 by a hand inserting method. The paper fed to a hand insertion paper feed roller 117 over the paper feed base plate 116 by the hand insertion is lightly depressed by the hand insertion paper feed roller 117 and is conveyed until the front edge portion of the paper reaches the resist shutter 105 in a manner similar to the case of the paper feed rollers 104 and 104'. The paper is slipped and rotated there. The subsequent conveying sequence is substantially the same manner as in case of the cassette feeding operation.

The fixing rollers 108 and 108' enclose a fixing heater 124. On the basis of the temperature detected by a thermister 123 which is come into slip contact with the surfaces of the fixing rollers, the temperatures of the surfaces of the fixing rollers are controlled to a predetermined temperature, thereby thermally fixing the toner image on the paper 101. Reference numeral 122 denotes a photosensor which is attached to discriminate whether the paper exists at the positions of the fixing rollers 108 and 108' or not.

The above printer engine is connected to a printer controller by interface means as shown in FIG. 36 and receives a print command and an image signal from the controller, thereby executing a printing sequence. Signals which are transmitted and received by the interface means will now be briefly described hereinbelow.

A PPRDY signal is a signal which is sent from the printer to the controller and indicates that a power source of the printer is turned on and the printer is in an operative mode.

A CPRDY signal is a signal which is sent from the controller to the printer and indicates that a power source of the controller is turned on and the controller is in an operative mode.

An RDY signal is a signal which is sent from the printer to the controller and indicates that the printer is in a state in which the printing operation can be started at any time a PRNT signal, which will be explained hereinlater, is received or in a state in which the printing operation can be continued. For instance, the RDY signal is set to "false" when the printing operation cannot be executed in the case where no paper remains on the paper cassette 102 or the like.

The PRNT signal is a signal which is sent from the controller to the printer and instructs to start or continue the printing operation. When the PRNT signal is received, the printer starts the printing operation.

A VSREQ signal is a signal which is sent from the printer to the controller and indicates that when the RDY signal which is sent from the printer is in a "true" signal, by setting the PRNT signal from the controller into "true", an instruction to start the printing operation is transmitted and, after that, the printer is in a state in which the image data can be received. In this state, a VSYNC signal, which will be explained hereinlater, can be received.

The VSYNC signal is a signal which is sent from the controller to the printer and is a signal to obtain a transmission timing synchronization of the image data for the sub scan direction. By the above synchronization, the toner image formed on the drum is transferred onto the paper synchronously with the paper in the sub scan direction.

A BD signal is a signal which is sent from the printer to the controller and is a signal to obtain a transmission timing synchronization of the image data for the main scan direction. By the above synchronization, the toner image formed on the drum is transferred onto the paper synchronously with the paper in the main scan direction. The BD signal indicates that the scan laser beam is located at the start point of the main scan.

A VDO signal is a signal which is sent from the controller to the printer and is a signal to transmit the image data to be printed. The VDO signal is sent synchronously with a VCLK signal, which will be explained hereinlater. The controller receives code data such as a PCL code or the like which is transmitted from the host apparatus and allows a character generator to generate a character bit signal corresponding to the code data received. The controller receives a vector code such as a postscript code or the like which is transmitted from the host apparatus and generates graphic bit data corresponding to the code and generates the bit image data which has been read out from the image scanner. The bit image data is transmitted as a VDO signal to the printer. The printer prints a black image when the VDO signal is "true". The printer prints a white imate when the VDO signal is "false".

An SC signal is a bidirectional serial signal for bidirectionally transmitting and receiving "command" as a signal which is sent from the controller to the printer and "status" as a signal which is sent from the printer to the controller. An SCLK signal, which will be explained hereinlater, is used as a sync signal to transmit or receive the SC signal. An SBSY signal and a CBSY signal, which will be explained hereinbelow, are used as signals to control the transmitting direction of the bidirectional signal. The "command" signal is a serial signal consisting of eight bits and relates to command information for allowing the controller to instruct the printer to know whether, for instance, the paper feeding mode is a mode to feed the paper from the cassette or a mode to feed the paper from the hand insertion port. The "status" signal is a serial signal consisting of eight bits and relates to information for allowing the printer to inform the controller of each printer state such as waiting state in which the temperature of the fixing device of the printer doesn't yet reach the printable temperature, paper jam state, paper cassette absent state, or the like.

The SCLK signal is a sync pulse signal for allowing the printer to takes the "command" or for allowing the controller to take the "status".

The CBSY signal is a signal to occupy the SC signal and SCLK signal before the controller trasmits the "command".

The SBSY signal is a signal to occupy the SC and SCLK signals before the printer transmits the "status".

The above interface operation will now be further explained hereinbelow.

When a power switch of the printer is turned on and a power switch of the controller is also turned on, the printer initializes the internal state of the printer and, after that, sets the PPRDY signal into "true" for the controller. On the other hand, the controller similarly initializes the internal state of the controller and, after that, sets the CPRDY signal into "true" for the printer. Due to this, the printer and the controller can know that their power sources have been turned on.

After that, when the printer supplies a current to the fixing heater 124 enclosed in the fixing rollers 108 and 108' and the surface temperature of the fixing roller reaches the temperature at which the toner image can be fixed, the RDY signal is set into "true". After the controller confirmed that the RDY signal is in a "true" state, when there is data to be printed, the controller sets the PRNT signal into "true" for the printer. When the printer confirms that the PRNT signal is "true", the photosensitive drum 111 is rotated and the potential of the surface of the drum is initialized to a predetermined potential. Further, in the cassette paper feeding mode, the paper feed cam 103 is driven, thereby conveying the paper until the front edge portion of the paper reaches the position of the resist shutter 105. In the hand insertion paper feeding mode, the paper which has been inserted from the paper feed base plate 116 by the hand insertion paper feed roller 117 by the hand is conveyed to the position of the resist shutter 105. After that, when the printer enters a state in which the VDO signal can be received, the VSREQ signal is set to "true". After the controller confirmed that the VSREQ signal is in the "true" state, the controller sets the VSYNC signal into "true" and sequentially transmits the VDO signal synchronously with the BD signal. When the printer confirms that the VSYNC signal is "true", the printer drives the resist solenoid 106 and releases the resist shutter 105 synchronously with the VSYNC signal. Thus, the paper 101 is conveyed to the drum 111. In response to the VDO signal, the printer lights on the laser beam when the image should be printed in black. The printer lights off the laser beam when the image should be printed in white. In this manner, the latent image is formed on the drum 111. The toner is deposited onto the latent image and developed by the developing device 114, thereby forming a toner image. The toner image on the drum is subsequently transferred onto the paper 101 by the transfer charging device 115 and fixed by the fixing rollers 108 and 108'. After that, the paper is delivered onto the paper delivery tray.

Processes of the printing operation in the printer controller 202 will now be described with reference to FIG. 36.

In the diagram, reference numeral 214 denotes an image memory to store bit map data (image data) of one page; 215 an address generation unit to generate an address in the image memory 214; 216 an output buffer register to convert the image data read out from the image memory 214 into the image signal VDO; 217 a sync clock generation circuit to generate the image clock signal VCLK synchronized with the BD signal; 218 a CPU to control the whole controller; 219 a printer interface as an input section of the signal with the printer engine 201; 220 a host interface as an input/output section of the signals with an external host apparatus such as a personal computer or the like; and 221 an image data generation unit to generate bit map data to be actually printed on the basis of code data which is sent from the external host apparatus. Reference numeral 222 denotes an operation panel. The operator operates the operation panel and can select various kinds of functions and modes of the printer.

In the above construction, the operation when the image signal VDO is transmitted to the printer engine will now be described.

The printer controller 202 receives the code data from the external host apparatus and generates the image data in accordance with the code data and stores into the image memory 214. When the image data of one page of paper is prepared in the image memory 214, the printer controller 202 sends the print request signal PRNT to the printer engine 201. When the PRNT signal is received, the printer engine 201 starts the printing operation. At a time point when the printer engine enters a state in which it can receive the vertical sync signal VSYNC, the printer engine 201 sends the VSREQ signal to the printer controller 202. When the VSREQ signal is received, the printer controller 202 sends the vertical sync signal VSYNC to the printer engine 201 and counts a predetermined time from the VSYNC signal in order to allow the image data to be printed from a predetermined position in the sub scan direction. After the predetermined time was counted, the address generation unit 215 sequentially generates addresses from the head address of the image data stored in the image memory 214, thereby reading out the image data. The read-out image data is supplied to the output buffer register 216 every one main scan line. To enable the image data to be printed from a predetermined position in the main scan direction, the output buffer register 216 receives the BD signal every print line and counts the image clock signals VCLK and, after that, sends the data of the relevant print line to the printer engine 201 as an image signal VDO synchronized with the VCLK signal. The above image forming operation is executed by the printer engine 201.

By performing the above operations every print page, the print data is always printed at the same position on the paper.

In recent years, however, the realization of a high precision of the print output is required even in a laser beam printer. For this purpose, a method of realizing a high resolution of the laser beam printer is considered. However, for instance, in case of setting the resolution to 600 dpi which is twice as high as 300 dpi, the capacity of the image memory which is needed in the printer controller is set to a value which is four times as large as the capacity in case of 300 dpi, so that the apparatus is expensive. On the contrary, in order to obtain a printing speed similar to the speed in case of 300 dpi, an output frequency of the image data is set to a frequency which is four times as high as the speed in case of 600 dpi, so that the printer controller also must operate at a speed of four times. Consequently, there are disadvantages from viewpoints of the technique and costs. When considering application softwares, most of them are manufactured for resolutions of about 240 to 300 dpi. Therefore, there is a problem such that even if the printer controller for 600 dpi is manufactured, it cannot cope with those application softwares. Accordingly, a technique for effectively using the above application softwares and for realizing a high precision of the print output is necessary. As such a technique, as disclosed in JP-A-2-60764, there has been proposed a technique such that the image data of 300 dpi formed by the controller is converted into the data of 600 dpi which has been smoothed in both of the main scan and sub scan directions by the data interpolation and is printed by the engine of 600 dpi.

On the other hand, in recent years, there has also been proposed a technique such that the image data of 300 dpi is converted into the data of 1200 dpi which has been smoothed in only the main scan direction so as to have a density of four times as the density in case of 300 dpi and is printed. Although the resolution of the engine in this case is set to 300 dpi, there is also a case where a picture quality is equal to or higher than that of the image printed by the engine of 600 dpi in dependence on an image pattern which is outputted. However, even in such a case, there is a limitation and the cheap printer of 600 dpi which can more stably obtain the image of a further high picture quality is necessary.

By using the above technique, a fairly good picture quality is obtained in case of an image such as characters or figure. However, according to :the above technique, since the resolution in the sub scan direction is the same as that of the conventional printer, it cannot be applied to a half tone image of a dither or the like. Therefore, a printer which can cheaply obtain an image of a high picture quality even in a half tone image by using the engine of 600 dpi is needed.

SUMMARY OF THE INVENTION

The present invention is made in consideration of the foregoing conventional techniques and it is an object of the invention to provide an image processing apparatus and a recording apparatus in which a smoothing image of a high picture quality can be obtained even for any of a character image and a half tone image.

Another object of the invention is to provide an image processing apparatus and a recording apparatus in which a half tone image such as a dither image of a low density or the like can be converted into a half tone image of a high density and a high picture quality by a simple construction.

Still another object of the invention is to provide an image processing apparatus and a recording apparatus in which even in the case where a printer controller has only a cheap image memory of a capacity corresponding to data of, for example, 300 dpi, by executing a converting process of an image signal, a smooth image of a high picture quality in which the performance of an engine of, for instance, 600 dpi is effectively used can be obtained for both of a half tone image and an image such as characters, figure, or the like.

Further another object of the invention is to provide an image processing apparatus and a recording apparatus in which the presence or absence of a smoothing process to a character image and the presence or absence of a smoothing process to a dither image can be independently selected.

Further another object of the invention is to provide an image processing apparatus and a recording apparatus in which by changing a smoothing process on the basis of a resolution of input data, a smoothed image of a high picture quality can be obtained irrespective of the resolution of the input data.

To accomplish the above objects, according to the present invention, there is provided an image processing apparatus comprising: input means for inputting image information of a density lower than a recording density of a recording mechanism section produced by a recording control section; memory means for storing the image information supplied from the input means by an amount of a plurality of main scan lines; referring means for referring image information of a recording pixel and its peripheral pixels from a group of image information stored in the memory means; detecting means for detecting that the recording pixel and its peripheral pixels form a part of a predetermined half tone pattern which is constructed by a plurality of pixels as a result of the reference by the referring means; converting means for converting the image information of the recording pixel into the image information of a density which is equal to or larger than at least the recording density of the recording mechanism section in accordance with the result of the detection by the detecting means; and transmitting means for transmitting the image information converted by the converting means to the recording mechanism section.

To accomplish the above objects, a recording apparatus of the present invention comprises: image information producing means for producing image information of a first recording density; recording means for recording information onto a recording medium at a second recording density higher than the first recording density; memory means for storing the image information of the first recording density produced by the image information producing means; referring means for referring to the image information of a recording pixel and its peripheral pixels from the group of image information stored in the memory means; first detecting means for detecting that the recording pixel forms a part of a predetermined half tone pattern which is constructed by a plurality of pixels as a result of the reference by the referring means; first converting means for converting the image information of the recording pixel into the image information having a density which is equal to or larger than at least the second recording density in accordance with the result of the detection by the first detecting means; second detecting means for detecting as a result of the reference by the referring means that the recording pixel forms a part of an edge of the image; second converting means for converting the image information of the recording pixel into the image information having a density which is equal to or larger than at least the second recording density in accordance with the result of the detection by the second detecting means; and information synthesizing means for synthesizing the image information converted by the first converting means and the image information converted by the second converting means and thereby for forming information to be recorded by the recording means.

Further another object of the invention is to provide a recording apparatus in which a recording density in the sub scan direction is set to a first recording density $D_1$, wherein the recording apparatus has at least two or more recording modes among five recording modes (1) to (5) shown below.

(1) Mode in which the information for each main scan in the image information produced at a second recording density $D_2$ (=$D_1/n$) which is 1/n (where, n>1) of the first recording density $D_1$ is repeated every n times with respect to each of the main scan and the sub scan, thereby recording the information at the second recording density $D_2$ with regard to both of the main scan and the sub scan.

(2) Mode in which the image information produced at the second recording density $D_2$ is converted into the information at the density of n times in both of the main scan and the sub scan, that is, at the first recording density $D_1$ and is recorded.

(3) Mode in which the image information produced at the second recording density $D_2$ is converted into the information whose density is increased by m times (where m>n) in the main scan direction and whose density is increased by n times in the sub scan direction with respect to each of the main scan and the sub scan and is recorded.

(4) Mode in which the image information produced at the first recording density $D_1$ is recorded in both of the main scan and the sub scan.

(5) Mode in which the image information produced at the first recording density $D_1$ is converted into the information whose density is increased by k times (where, k>1) in the main scan direction with respect to each of the main scan and the sub scan and is recorded.

The above and other objects and features of the present invention will, become apparent from the following detailed description and the appended claims with reference to the accompanying drawings.

BRIEF DESCRIPTION OF THE DRAWINGS

FIG. 3 is a diagram showing data of 300 dpi×300 dpi;

FIG. 4 is a diagram showing an example in which data of one pixel of 300 dpi×300 dpi is converted into data of 600 dpi×600 dpi;

FIGS. 5 and 6 are diagrams for explaining dither matrices;

FIGS. 14A to 15C are comparison diagrams of a print image by the original image signal and a print image by the converted image signal according to the second embodiment;

FIG. 19 is a threshold value matrix according to the fourth embodiment;

FIGS. 27A to 28C are diagrams showing examples of the smoothed print result according to the fifth embodiment;

FIG. 32 is a timing chart for explaining the operation in the sixth embodiment of the invention;

DETAILED DESCRIPTION OF THE PREFERRED EMBODIMENTS

Preferred embodiments of the present invention will now be described in detail hereinbelow with reference to the drawings.

(First embodiment)

The first embodiment according to the present invention will now be described with respect to the case of a laser beam printer having a resolution of 600 dpi.

Figure 1:
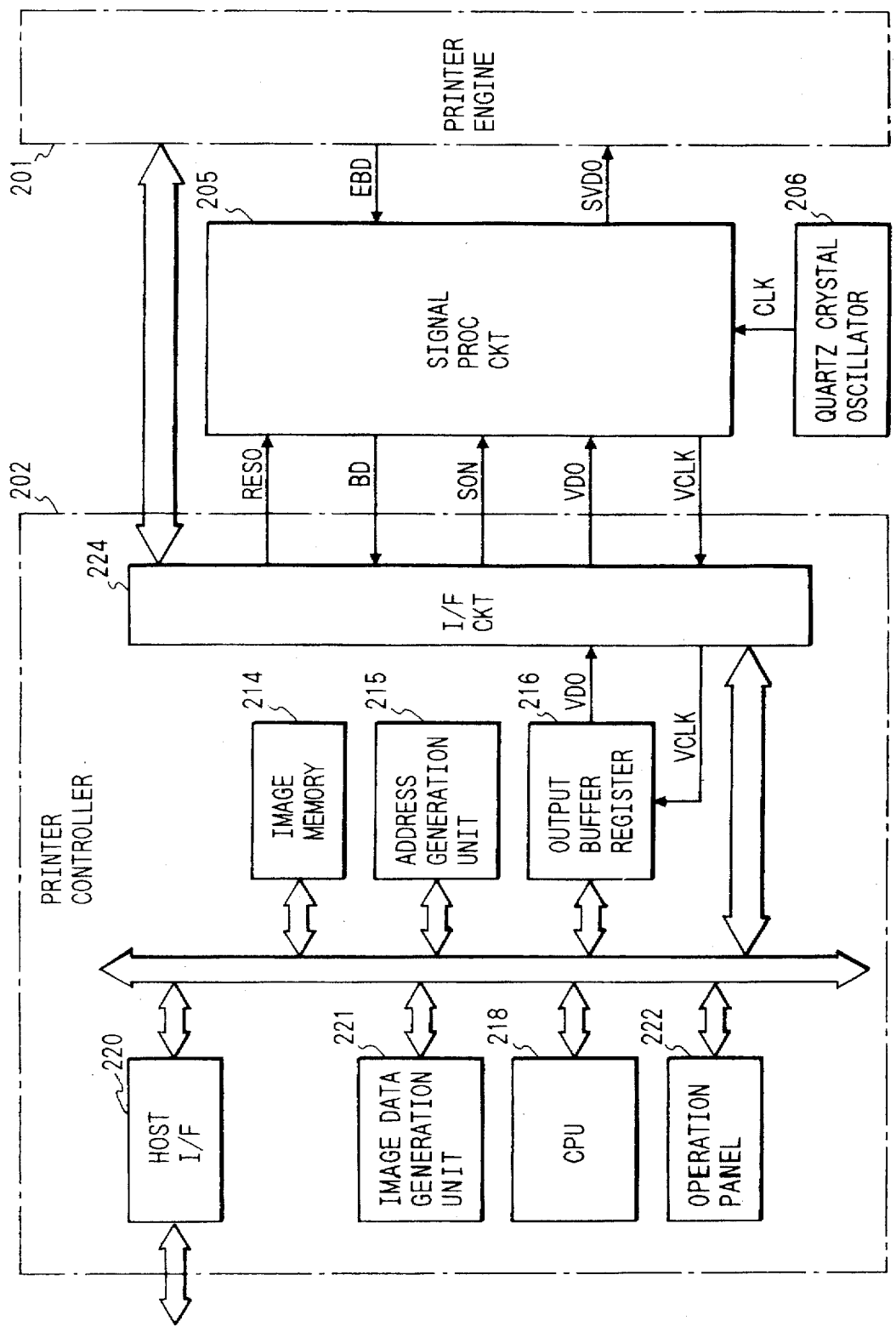
FIG. 1 is a block diagram of a laser beam printer according to an embodiment of the present invention.
Figure 2:
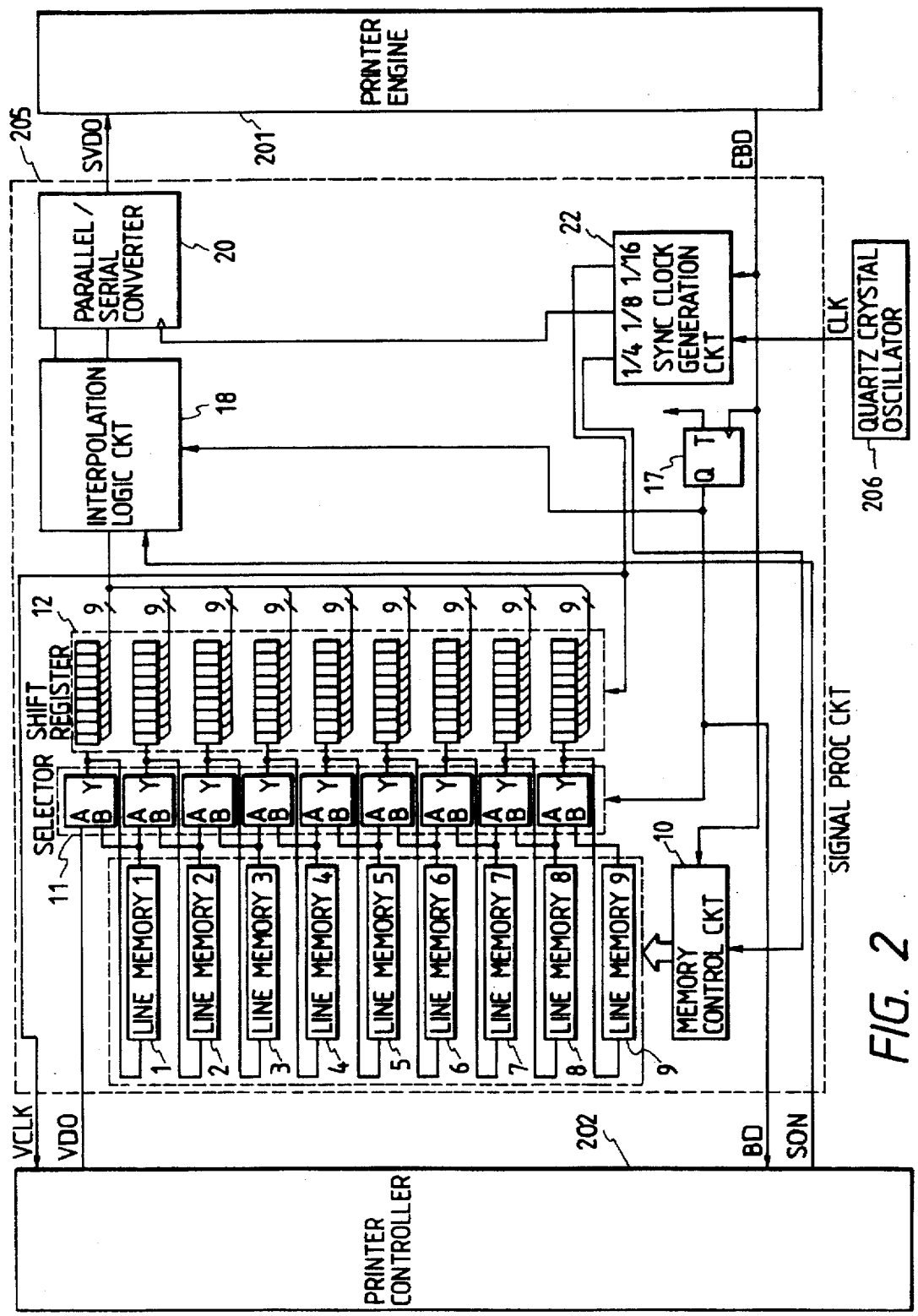
FIG. 2 is a block diagram of a signal processing circuit in the first embodiment.

FIG. 1 is a block diagram of a laser beam printer to which an image processing apparatus according to the present invention is applied. As shown in the diagram, a signal processing circuit 205 and a quartz crystal oscillator 206 are connected between the printer controller 202 and the printer engine 201. The signal processing circuit 205 executes processes such that an image signal VDO of 300 dpi is received from the printer controller 202 by a transfer clock VCLK and is converted into an image signal SVDO of 600 dpi and the image signal SVDO is sent to the printer engine 201. Each block in the printer controller 202 is similar to that mentioned in the conventional apparatus. FIG. 2 is a block diagram of the signal processing circuit 205. In the diagram, reference numerals 1 to 9 denote line memories to store the image signal from the printer controller 202. Each of the line memories has a capacity enough to store the image signal of 300 dpi by an amount of one line of the main scan. Reference numeral 10 denotes a line control circuit to control the writing and reading operations of the line memories 1 to 9; 11 selectors each of which selects one of two inputs A and B and generates the selected input signal to a terminal Y; 12 shift registers each of which is constructed by 9×9 bits and outputs image data while shifting 81 image data each time a clock is received; 17 a toggle flip-flop (T-FF); 18 an interpolation logic circuit having a function to convert the image signal of 300 dpi from the printer controller 202 into the signal of 600 dpi; 20 a parallel/serial converting circuit for converting parallel two-bit output signals from interpolation logic circuit 18 into a serial signal and outputting; and 22 a sync clock generation circuit for frequency dividing a clock signal CLK from the quartz crystal oscillator 206 synchronously with a horizontal sync signal EBD from the printer engine 201 every main scan and for generating clock signals of frequency division ratios of ¼, ⅛, and 1/16, respectively.

In the above construction, the printer controller 202 transmits the image signal VDO of a density of 300 dpi to the signal processing circuit 205.

Figure 6:
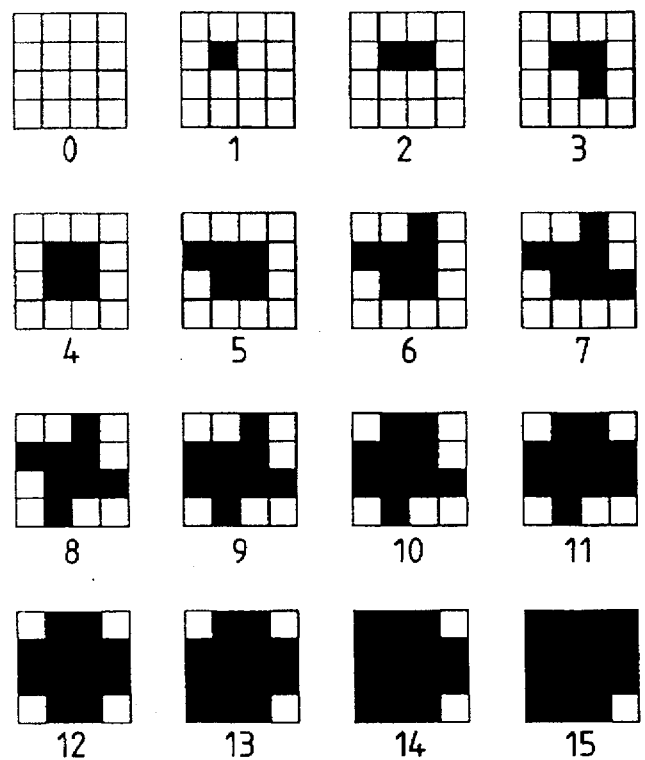

The operation of the signal processing circuit 205 will now be described. First, the BD signal which is equivalent to the signal in case of the printer engine of 300 dpi which is obtained by thinning out the horizontal sync signal EBD from the printer engine 201 every other line is transmitted as a horizontal sync signal BD to the printer controller 202. Each time the horizontal sync signal BD is received, the printer controller 202 transmits the VDO signals of an amount corresponding to one line of the main scan synchronously with the image clock signal VCLK which is sent from the signal processing circuit 205. The VCLK signal is obtained by frequency dividing the output signal CLK of the quartz crystal oscillator 206 into 1/16 by a frequency dividing circuit in the sync clock generation circuit 22 synchronously with the EBD signal. The VDO signal $L_1$ of the first line supplied to the signal processing circuit 205 is sent to the first bit of the shift register 12 through the selector 11 and is also written into the line memory 1. The selector 11 is alternately switched by the EBD signal from the printer engine. That is, the A input is selected for the odd-number designated lines in the case where they are seen on a 600 dpi unit basis from the printer engine, while the B input is selected for the even-number designated lines. Therefore, in the next main scan, the VDO signal $L_1$ of the first line which is read out from the line memory 1 is again sent to the first bit of the shift register 12 and is also written into the line memory 1. In this instance, since no BD signal is sent to the controller, the controller stops the transmission of the VDO signal for periods of time corresponding to the even-number designated lines. Further, in the next main scan, the VDO signal $L_2$ of the second line for the controller is received from the printer controller and, at the same time, the VDO signal at the same position of the first line which has been stored in the line memory 1 is read out. Both of the VDO signal $L_2$ and the read-out VDO signal are supplied to the first and second bits of the shift register 12. The VDO signal of the second line supplied is written into the line memory 1. The signal read out from the line memory 1 is written into the same address in the line memory 2. In this manner, the writing and reading operations of the VDO signal of the same line are executed every two times for each of the line memories 1 to 9 and the VDO signals are inputted into the shift register 12. Therefore, the image signals of the same nine lines are successively generated from the shift registers 12 for a period of time corresponding to two lines of the main scan. The image signal of 81 dots is supplied to the interpolation circuit 18. As shown in FIGS. 3 and 4, the interpolation circuit 18 refers to the image signals of the peripheral pixels around a target pixel M and converts into signals a, b, c, and d in which the densities in the main scan and sub scan directions are twice as large as those of the image signal for the target pixel M. The above conversion is executed by comparing the output data of the shift register 12 and a plurality of predetermined dot patterns. The dot patterns have been predetermined on the basis of, for example, a predetermined dither matrix of 4 dots (main scan)×4 dots (sub scan) as shown in FIG. 5. A dither method relates to a technique which is widely used as a binarization recording method of a half tone. By comparing the multi-value data for a certain pixel with a value of a predetermined threshold matrix (dither matrix), the binarization is executed. In the dither method, when the input multivalue data is set to a predetermined value in a wide range, namely, in case of a predetermined tone, the binarized result repeats the same pattern. It is now assumed that there is used a rule such that a method (fatting type or dot concentrating type) whereby, for instance, a dither matrix sequentially becomes fat around the center of 4×4 shown in FIG. 5 as a nucleus is used and when the input multivalue data consists of four bits and the input multivalue data is equal to or larger than the threshold value of the dither matrix, the pixel is printed in black. On this assumption, the binarized dither patterns by various value (0 to 15) are as shown in FIG. 6.

Figure 7:
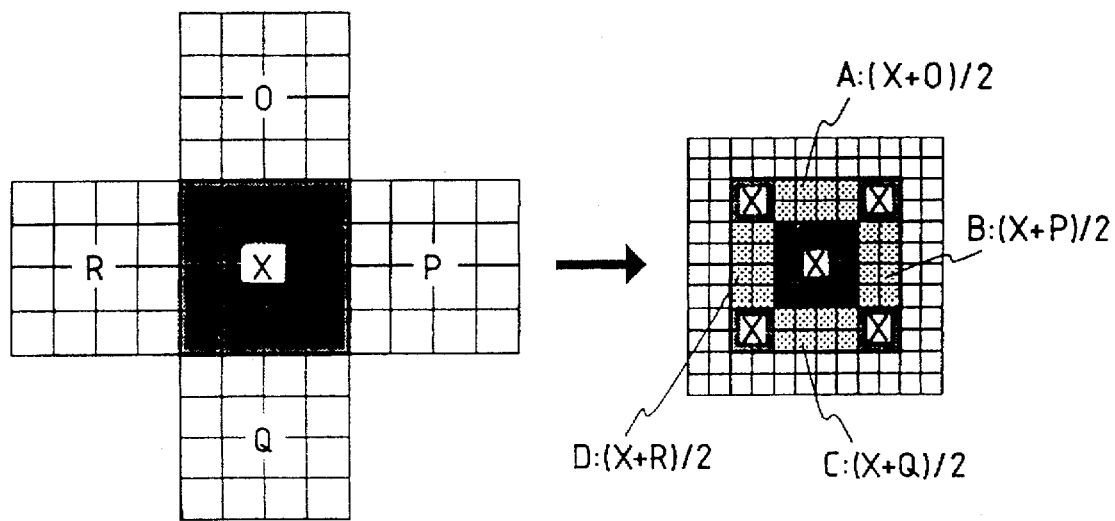
FIGS. 7 and 8 are diagrams for explaining the conversion of the image signal in the first embodiment.

The dot pattern according to the embodiment is constructed by using the feature of the dither method mentioned above. It is discriminated: that the target pixel M is a part of the half tone image by a predetermined dither matrix, and the target pixel M is converted. When converting, the pixel data in the dither matrix X including the target pixel M is converted into the data as shown in FIG. 7.

The logic of the above conversion will now be described further in detail. In FIG. 7, explanation will now be made on the assumption that each of the regions O, P, Q, R, and X corresponds to a dither matrix of 4×4 and the level of the input multivalue data is constant in the same dither matrix. The pixel data in the region of 4×4 of 300 dpi is converted into the data in the region of 8×8 of 600 dpi surrounded by a bold line on the right side in FIG. 7. In the region of 8×8, the dot pattern of the dither matrix X is allocated as it is to the region of 4×4 in the central portion. In the regions each consisting of four pixels at four corners in the region of 8×8 surrounded by the bold line, when it is now assumed that the dither pattern of the dither matrix X is repeated, the dot pattern at the relevant position is allocated. By converting the pixel data as mentioned above, the image consisting of the dither matrix of 4×4 of 300 dpi can be converted into the image of the dither matrix of 4×4 of 600 dpi of the same density. The remaining regions (hereinafter, referred to as "A", "B", "C", and "D") in the region of 8×8 surrounded by the bold line will now be described. Upon conversion of those portions, in addition to the data in the dither matrix X, the data in the adjacent dither matrix O, P, Q, or R is also referred. Practically speaking, it is now assumed that the region "A" corresponds to the data of the intermediate density of the original data X and the data of the adjacent dither matrix O which is adjacent on the upper side to the original data X. The dot data at the relevant position of the dither pattern of such an intermediate density is allocated in the region "A". When the dither pattern of the dither matrix O is the same as the dither pattern of the dither matrix X, the dither pattern of the region X is repeated. Similarly, in the region "B", the data is converted to the data of the intermediate density of the original data X and the data of the dither matrix P which is adjacent on the right side to the original data X. In the region "C", the data is converted into the data of the intermediate density of the original data X and the data of the dither matrix Q which is adjacent on the lower side to the original data X. In the region "D", the data is converted into the data of the intermediate density of the original data X and the data of the dither matrix R which is adjacent on the left side to the original data X. By converting the data as mentioned above, smoother gradations can be obtained.

Figure 8:
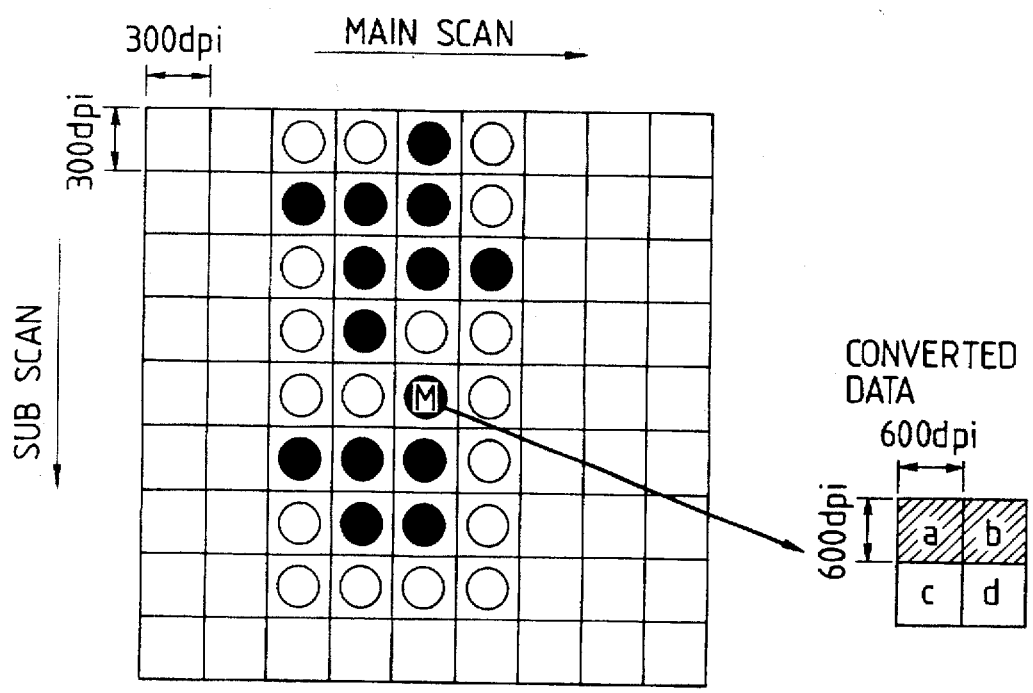

FIG. 8 shows an example of a dot pattern for realizing a change as mentioned above. In FIG. 8, ● indicates a black dot, ○ shows a blank dot, and the other portions in the region to be referred denote that any one of the black dot and the blank dot can be arbitrarily set. The converted image data indicates that the hatched portion is printed in black. The example shown here relates to the case where the position of the converted pixel of the target pixel M is included in the region "A", the value of the dither matrix X included in the target pixel M is equal to "6", and the value of the dither matrix O which is adjacent on the upper side to the dither matrix X is equal to "8". Namely, the above example relates to the case of converting the data in the region "A" into the dither pattern of "7" of the intermediate density. The data of the target pixel M is compared with such a number of dot patterns and is determined.

Figure 9:
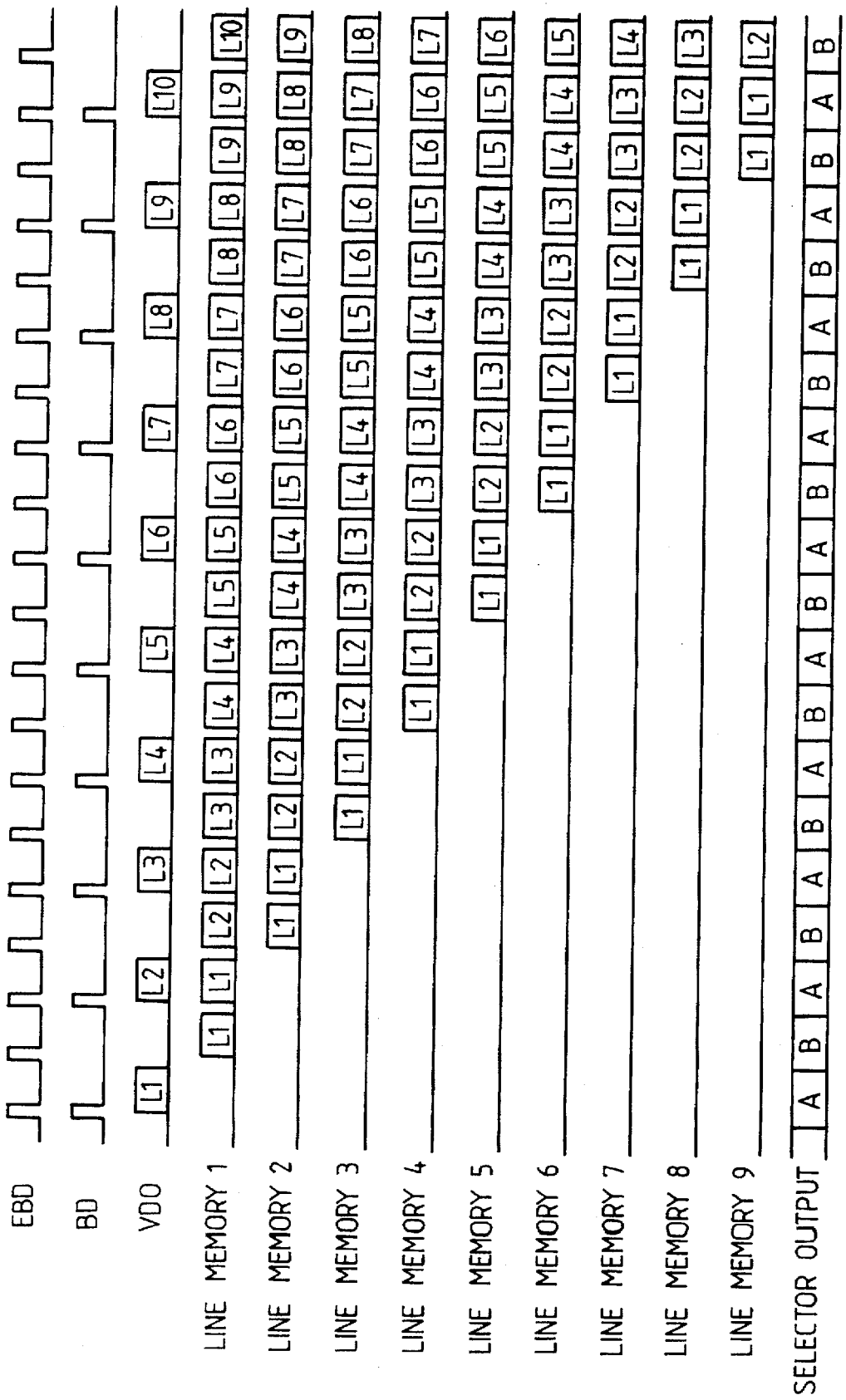
FIG. 9 is a timing chart of an image signal of every line.

The order of the conversion is set such that two converted data a and b are formed at the odd-number designated lines and two data c and d are formed at the even-number designated lines. The signals formed are converted into the serial signal by the parallel/serial converter 20 and is sent as an image signal SVDO to the printer engine 201. Therefore, the image signal SVDO is the signal having a density of 600 dpi in both of the main scan and the sub scan. However, in the case where "there is no smoothing process" is designated from the printer controller 202 by a smoothing processing designation signal SON, the VDO signal of 300 dpi in both of the main scan and the sub scan is simply magnified by two times in both of the main scan and sub scan directions and the signal is sent to the printer engine 201 as an SVDO signal at a rate of 600 dpi. FIG. 9 shows timings of the above signals. In FIG. 9, the signals which are read out from the memory are shown with respect to the line memories $LM_1$ to $LM_9$. The printer engine 201 modulates the laser beam on the basis of the SVDO signal and executes the foregoing image forming operation.

As described above, by converting the data so that the densities in both of the main scan and sub scan directions of the image signal are increased by two times and by printing the converted data, even in case of the small memory of 300 dpi, a smooth half tone image of a high picture quality which effectively uses the performance of the printer engine of 600 dpi can be obtained.

Although the first embodiment has been described above with respect to the case where the dot pattern to be compared with the reference pixel is the dither matrix of the fatting type of 4×4, the invention is not limited to such a case. For instance, the invention can be also realized in case of another pattern such as dither matrix of 8×8, pattern based on the density patterning method, or the like. Further, by preparing a plurality of kinds of dot patterns as mentioned above, the logic can be also switched by a command or the like from the printer controller in accordance with an image to be printed. Although the above embodiment has been described with respect to the case where the density of the image signal from the printer controller is equal to 300 dpi and the resolution of the printer engine is equal to 600 dpi, the invention is not limited to such a case. For example, the invention can be also applied to the case of 240 dpi and 480 dpi or the case of 400 dpi and 800 dpi. On the other hand, although the above embodiment has been described with respect to the example in which when the density of the image signal from the controller is equal to 300 dpi, the data is converted into the data of 600 dpi whose scan line density is two times as large as that of 300 dpi and is printed, the invention is not limited to such a case. For instance, it is also possible to construct in a manner such that the printer engine of 900 dpi is used and the data is converted into the data whose scan line density is three times as large as that of 300 dpi and is printed.

(Second embodiment)

The above first embodiment has been described with respect to the example in which only the half tone image is converted into the data of 600 dpi. An example in which the smoothing conversion is also executed for a binary image such as characters, figure, or the like will now be described as a second embodiment. For this purpose, the image signal from the printer controller is converted into the signal which has been smoothed by increasing the density in the main scan direction by eight times and the density in the sub scan direction by two times.

Figure 10:
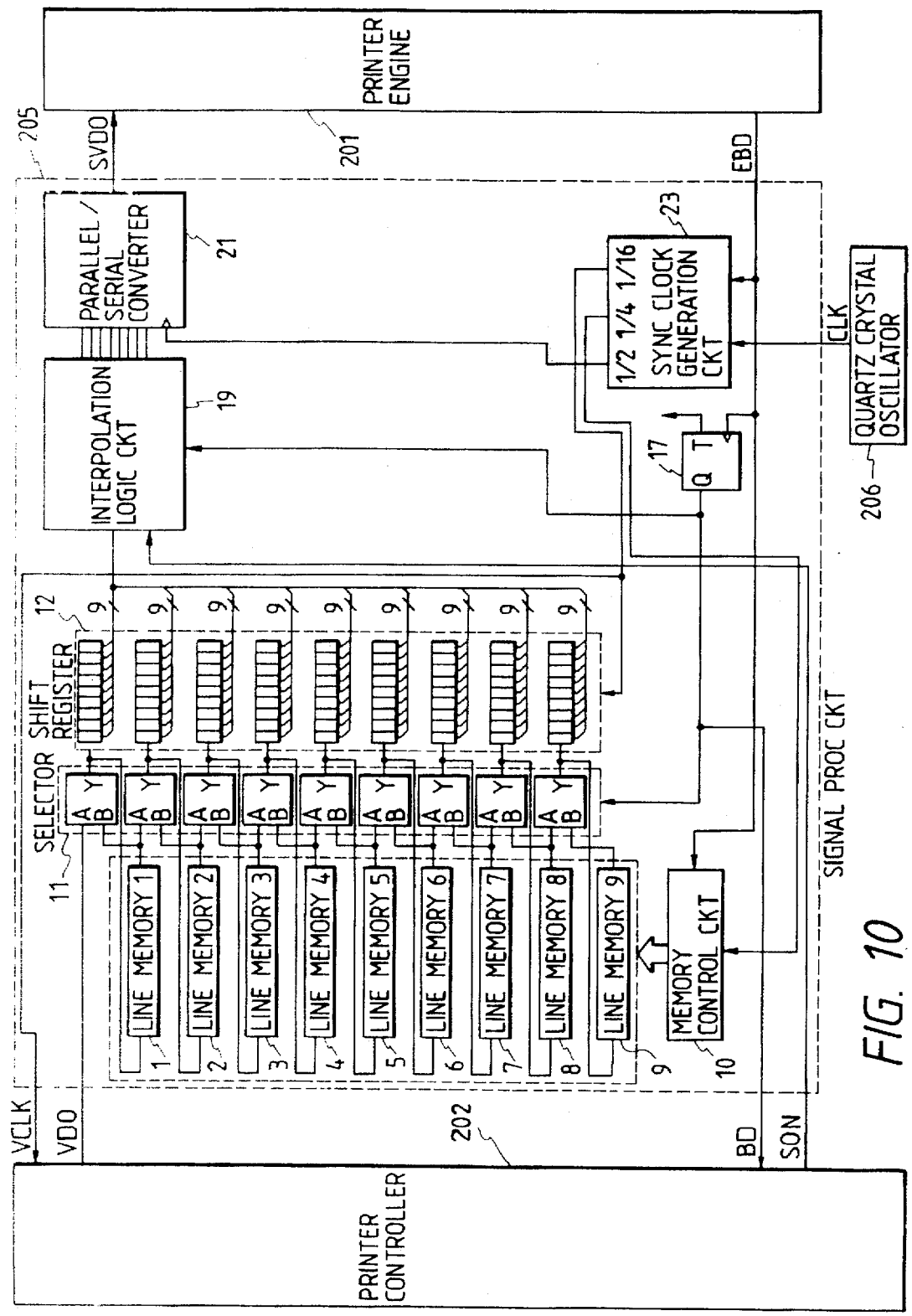
FIG. 10 is a block diagram of a signal processing circuit according to the second embodiment.

FIG. 10 shows a block diagram of the signal processing circuit 205 in the second embodiment of the present invention. In FIG. 10, the portions having functions similar to those shown in the first embodiment are designated by the same reference numerals and their descriptions are omitted here. In the diagram, the second embodiment differs from the first embodiment with respect to an interpolation circuit 19, a parallel/serial converter 21, and a sync clock generation circuit 23.

The interpolation logic circuit 19 has a function to convert the image signal of 300 dpi from the printer controller 202 into the signal of 2400 dpi (main scan)×600 dpi (sub scan).

That is, in the main scan direction, the recording width of the data of 600 dpi of one pixel is further divided into four portions and is outputted as data of 2400 dpi.

The parallel/serial converter 21 converts the parallel 8-bit output signals from the interpolation logic circuit 19 into the serial signal and generates the serial signal. Reference numeral 23 denotes the frequency dividing circuit of the sync clock generation circuit for frequency dividing the clock signal CLK from the quartz crystal oscillator 206 every main scan synchronously with the horizontal sync signal EBD from the printer engine 201 and for generating clock signals of frequency division ratios of ½, ¼, and ⅟₁₆.

Figure 11:
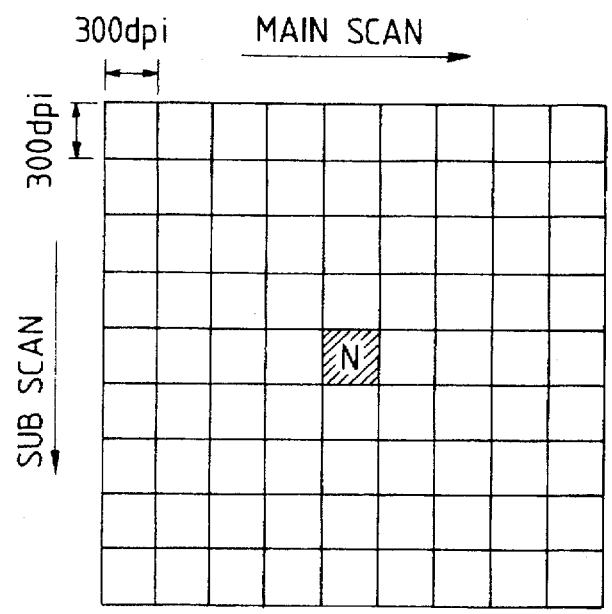
FIGS. 11 to 13B are diagrams for explaining the conversion of an image signal in the second embodiment.
Figure 12:
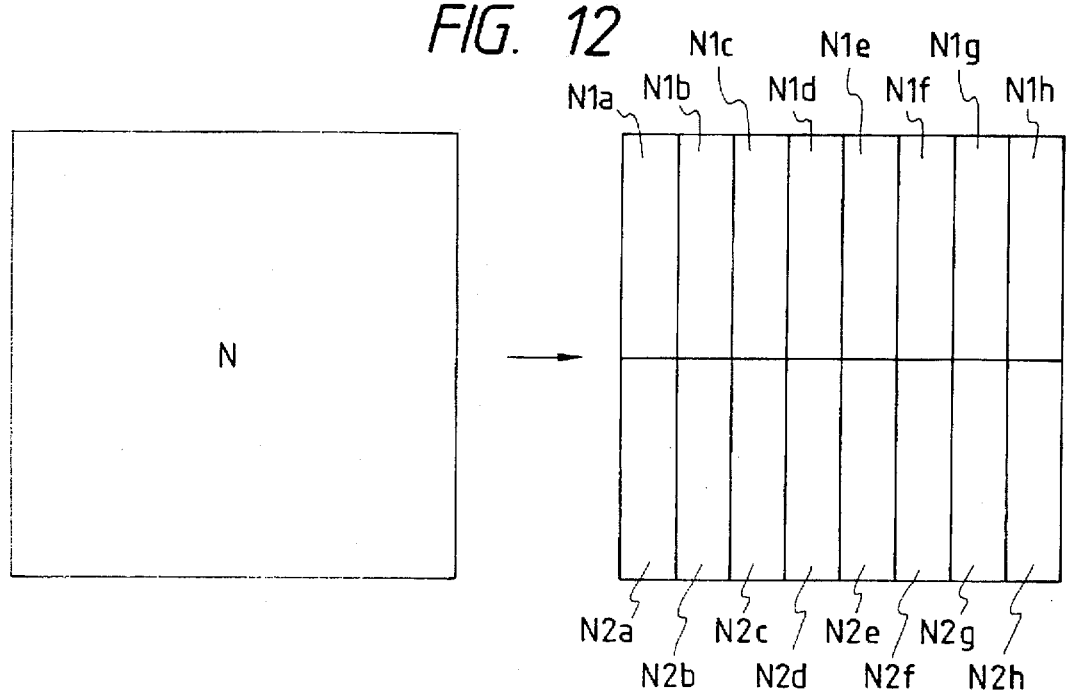

The operation will now be described. In a manner similar to the first embodiment, the image signals of a target pixel N of 300 dpi and 9 (main scan)×9 (sub scan) pixels around the target pixel N which are supplied from the printer control 202 are sent to the interpolation circuit 19. As shown in FIGS. 11 and 12, the interpolation circuit 19 refers the image signals of the peripheral pixels around the target pixel N and converts the image signal into the signal which has been smoothed by increasing the density in the main scan direction of the image signal for the target pixel N by eight times and the density in the sub scan direction by two times.

Figure 13A:
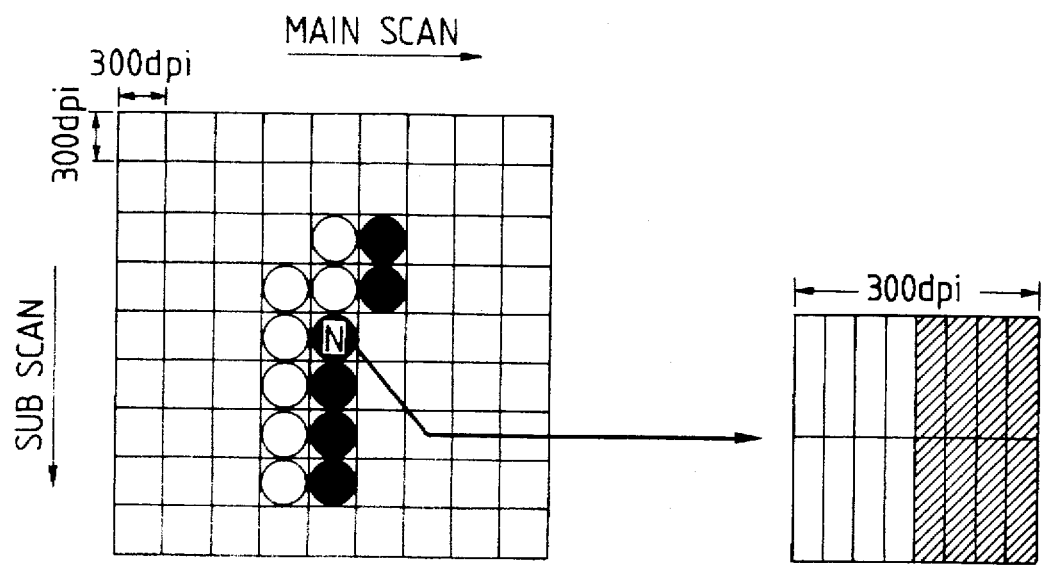
Figure 13B:
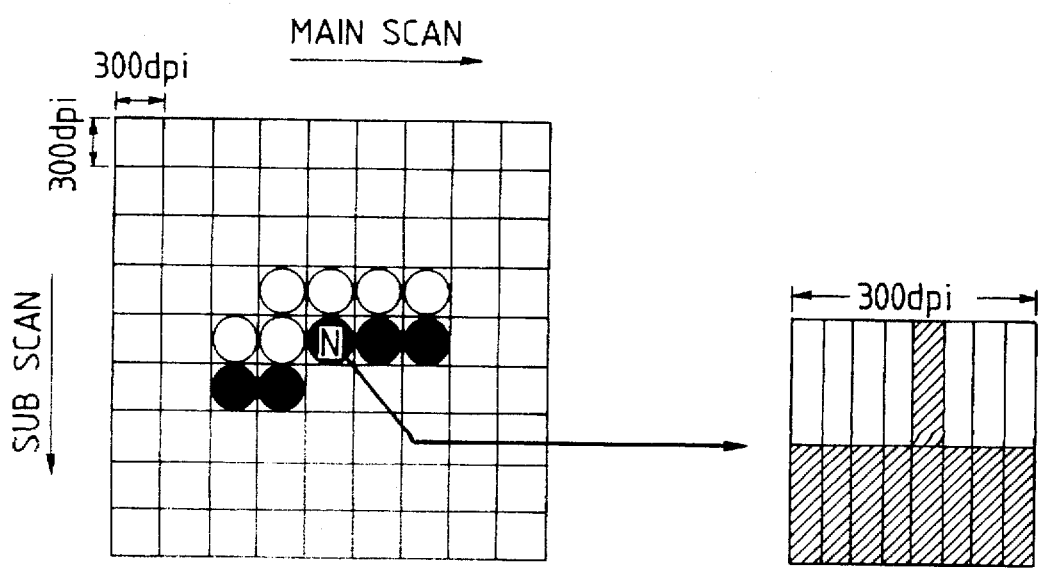

In a manner similar to the first embodiment, the above conversion is executed by comparing the output data of the shift register 12 with a plurality of predetermined dot patterns. The dot patterns are provided to extract a feature of the target pixel N and also include patterns for characters or figure in addition to the patterns for the dither images described in the first embodiment. For instance, in case of FIG. 13A, the target pixel N is regarded as a part of an oblique line near a vertical line (in the sub scan direction), so that it is converted into the data shown in the diagram. In case of FIG. 13B, on the other hand, the target pixel N is regarded as a part of an oblique line near a lateral line (main scan direction), so that it is converted into the data shown in the diagram. In FIGS. 13A and 13B, ● indicates a black dot, ○ shows a blank dot, and the other portions in the reference region denote that any one of the black dot and the blank dot can be arbitrarily set. The data of the target pixel N is compared with such a number of dot patterns and is determined. An algorithm to convert the image signal in case of the oblique line near the vertical line differs from that of the oblique line near the lateral line. As for an oblique line near the vertical line, the conversion to add or delete dots on a 2400 dpi unit basis is executed so as to reduce a level difference between the adjacent pixels. On the other hand, as for an oblique line near the lateral line, the conversion to add small dots of a 2400 dpi unit as a density to a portion near the pixels which form the level difference is executed. Such a conversion can be realized by controlling the recording time and the recording width. By adding the small dots as a density, the level difference portion of the printed image becomes blur and the image becomes smooth due to the characteristics of an electrophotograph, so that a smoothing effect is derived. For a dither image, the above conversion is executed to the data of 600 dpi with respect to both of the main scan and sub scan in a manner similar to the case described in the first embodiment. In this case, there is no need to perform the control to further divide one pixel into four portions. By the algorithms as mentioned above, sixteen converted data $N_{1a}$, $N_{1b}$, $N_{1c}$, $N_{1d}$, $N_{1e}$, $N_{1f}$, $N_{1g}$, $N_{1h}$, $N_{2a}$, $N_{2b}$, $N_{2c}$, $N_{2d}$, $N_{2e}$, $N_{2f}$, $N_{2g}$, and $N_{2h}$ of the target pixel N are determined.

As an order for conversion, eight data $N_{1a}$, $N_{1b}$, $N_{1c}$, $N_{1d}$, $N_{1e}$, $N_{1f}$, $N_{1g}$, and $N_{1h}$ are first formed at the odd-number designated lines and, subsequently, eight data $N_{2a}$, $N_{2b}$, $N_{2c}$, $N_{2d}$, $N_{2e}$, $N_{2f}$, $N_{2g}$, and $N_{2h}$ are formed at the even-number designated lines. The signals formed as mentioned above are converted into the serial signal by the parallel/serial converter 21 and is transmitted as an image signal SVDO to the printer engine 201 through the selector 11. The image signal SVDO, therefore, becomes the signal of a density of 2400 dpi (main scan)×600 dpi (sub scan). In the case where "there is no smoothing process" is designated by the smoothing process designation signal SON from the printer controller 202, the VDO signal of 300 dpi in both of the main scan and sub scan is converted into the SVDO signal as a rate of 600 dpi by increasing the densities in both of the main scan and sub scan directions by two times and the SVDO signal is transmitted to the printer engine 201. The printer engine 201 modulates the laser beam on the basis of the SVDO signal and executes the above image forming operation. FIGS. 14A to 14C and 15A to 15C are diagrams schematically showing examples of the images which are printed as a result of the processes as mentioned above. In the diagrams, FIGS. 14A and 15A show images which are actually printed by the original data of 300 dpi which is sent from the controller. FIGS. 14B and 15B show images which are actually printed by the data converted by the signal processing circuit. FIGS. 14C and 15C show images which are actually printed by the data shown in FIGS. 14B and 15B. One element of the lattice corresponds to one unit of 300 dpi.

In the second embodiment, by increasing the density in the main scan direction of the image signal by eight times and the density in the sub scan direction by two times, not only a half tone image but also an image of a high picture quality can be obtained even for characters, figure, or the like.

(Third embodiment)

An example in which the presence or absence of the smoothing process for a character image and the presence or absence of the smoothing process for a dither image can be independently selected with now be described as a modification of the second embodiment.

Figure 16:
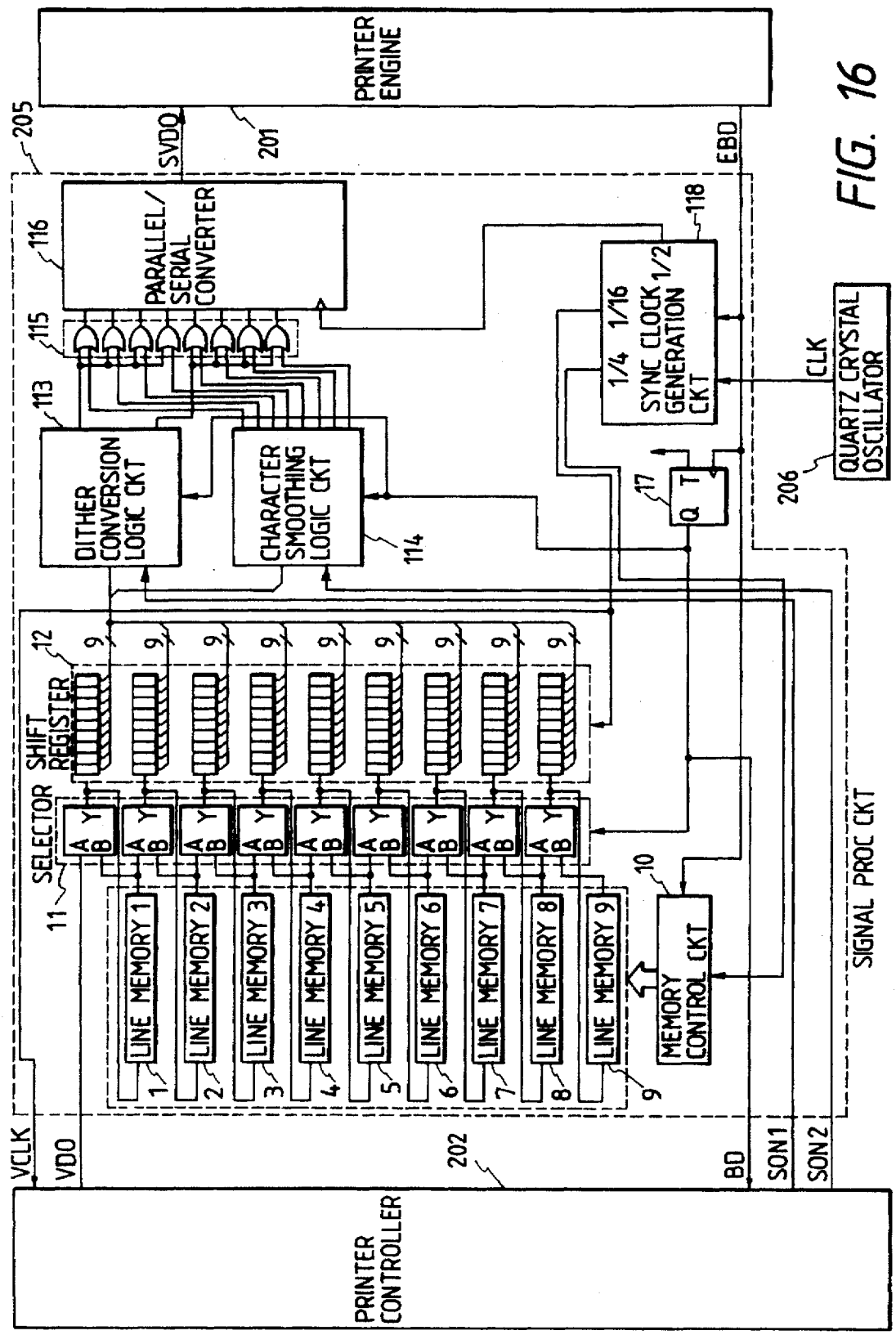
FIG. 16 is a block diagram of a signal processing circuit in the third embodiment.

FIG. 16 shows a block diagram of the signal processing circuit 205 according to the third embodiment of the present invention.

In FIG. 16, the portions having functions similar to those shown in the first and second embodiments are designated by the same reference numerals and their descriptions are omitted here.

Reference numeral 113 denotes a dither conversion logic circuit having a function to convert the image signal of 300 dpi from the printer controller 202 into the signal of 600 dpi (main scan)×600 dpi (sub scan); 114 a character smoothing logic circuit having a function to convert the image signal of 300 dpi from the printer controller 202 into the signal of 2400 dpi (main scan)×600 dpi (sub scan); 115 an OR circuit; 116 a parallel/serial converter to convert parallel 8-bit output signals from the OR circuit 115 into a serial signal and to output the serial signal; and 118 a sync clock generation circuit for frequency dividing the clock signal CLK from the quartz crystal oscillator 206 every main scan synchronously with the horizontal sync signal EBD from the printer engine 201 and for generating clock signals of frequency division ratios of ½, ¼, and ⅟₁₆.

In the above construction, the printer controller 202 transmits the image signal VDO of a density of 300 dpi to the signal processing circuit 205.

The operation of the signal processing circuit 205 will now be described. First, the BD signal which is equivalent to the signal in case of the printer engine of 300 dpi which is obtained by thinning out the horizontal sync signals EBD from the printer engine 201 every other line is transmitted as a horizontal sync signal BD to the printer controller 202. Each time the horizontal sync signal BD is received, the printer controller 202 transmits the VDO signal of one main scan line synchronously with the image clock signal VCLK which is sent from the signal processing circuit 205. The VCLK signal is a signal which is obtained by frequency dividing the output signal CLK of the quartz crystal oscillator 206 into ⅟₁₆ by the frequency dividing circuit of the sync clock generation circuit 118 synchronously with the EBD signal. The VDO signal $L_1$ of the first line supplied to the signal processing circuit 205 is sent to the first bit of the shift register 12 through the selector 11 and is written into the line memory 1. The selector 11 is alternately switched by the EBD signal from the printer engine. That is, the A input is selected at the odd-number designated lines when they are seen on a 600 dpi unit basis from the printer engine, while the B input is selected at the even-number designated lines. Therefore, in the next main scan, the VDO signal $L_1$ of the first line which is read out from the line memory 1 is again supplied to the first bit of the shift register 12 and is written into the line memory 1. In this instance, since the BD signal is not sent to the controller, the controller stops the transmission of the VDO signal for periods of time corresponding to the even-number designated lines. In the next main scan, further, the VDO signal $L_2$ of the second line for the controller is supplied from the printer controller and the VDO signal at the same position as the first line which has been stored in the line memory 1 is also read out. Those VDO signals are supplied to the first and second bits of the shift register 12, respectively. The VDO signal of the second line supplied is written into the line memory 1. The signal read out from the line memory 1 is written into the same address in the line memory 2. As mentioned above, the writing and reading operations of the VDO signal of the same line are executed every two times with respect to each of the line memories 1 to 9, while the VDO signals are supplied to the shift register 12. Therefore, the image signals of the same nine lines are continuously outputted from the shift register 12 for a period of time corresponding to two main scan lines. The image signals of those 81 dots are supplied to the dither conversion logic circuit 113 and character smoothing logic circuit 114.

As shown in FIGS. 3 and 4 mentioned above, the dither conversion logic circuit 113 refers to the image signals of the peripheral pixels around the target pixels M and converts the image signal for the target pixel M into the signals a, b, c, and d in which the densities in the main scan and sub scan directions of the image signal of the target pixel M are increased by two times. The above conversion is executed by comparing the output data of the shift register 12 with a plurality of predetermined matching patterns. The matching patterns have been predetermined on the basis of a predetermined threshold matrix of 4 dots (main scan)×4 dots (sub scan) as shown in, for instance, FIG. 5. The dither method is a technique which is widely used as a binarization recording method of a half tone. The binarization is executed by comparing the multivalue data for a certain pixel with values of a predetermined threshold value matrix (dither matrix). In the dither method, in the case where the input multivalue data has a predetermined value in a wide range, namely, in case of an image of a uniform tone, the binarized result repeats the same pattern. For example, it is now assumed that there is used a rule such that a method (fatting type or dot concentrating type) whereby the dither matrix sequentially becomes fat around the center of the 4×4 pixels shown in FIG. 5 as a nucleus is used and, when the input multivalue data consists of four bits and the input multivalue data is equal to or larger than the threshold value of the dither matrix, such a pixel is printed in black. On the above assumption, binarized dither patterns by various values (0 to 15) are as shown in FIG. 6.

The matching patterns according to the third embodiment are constructed by using the feature of the dither method mentioned above. The matching pattern is compared with the image signal. When they coincide, it is discriminated that the target pixel M forms a part of the half tone image due to a predetermined dither matrix. The target pixel M is converted.

Figure 17:
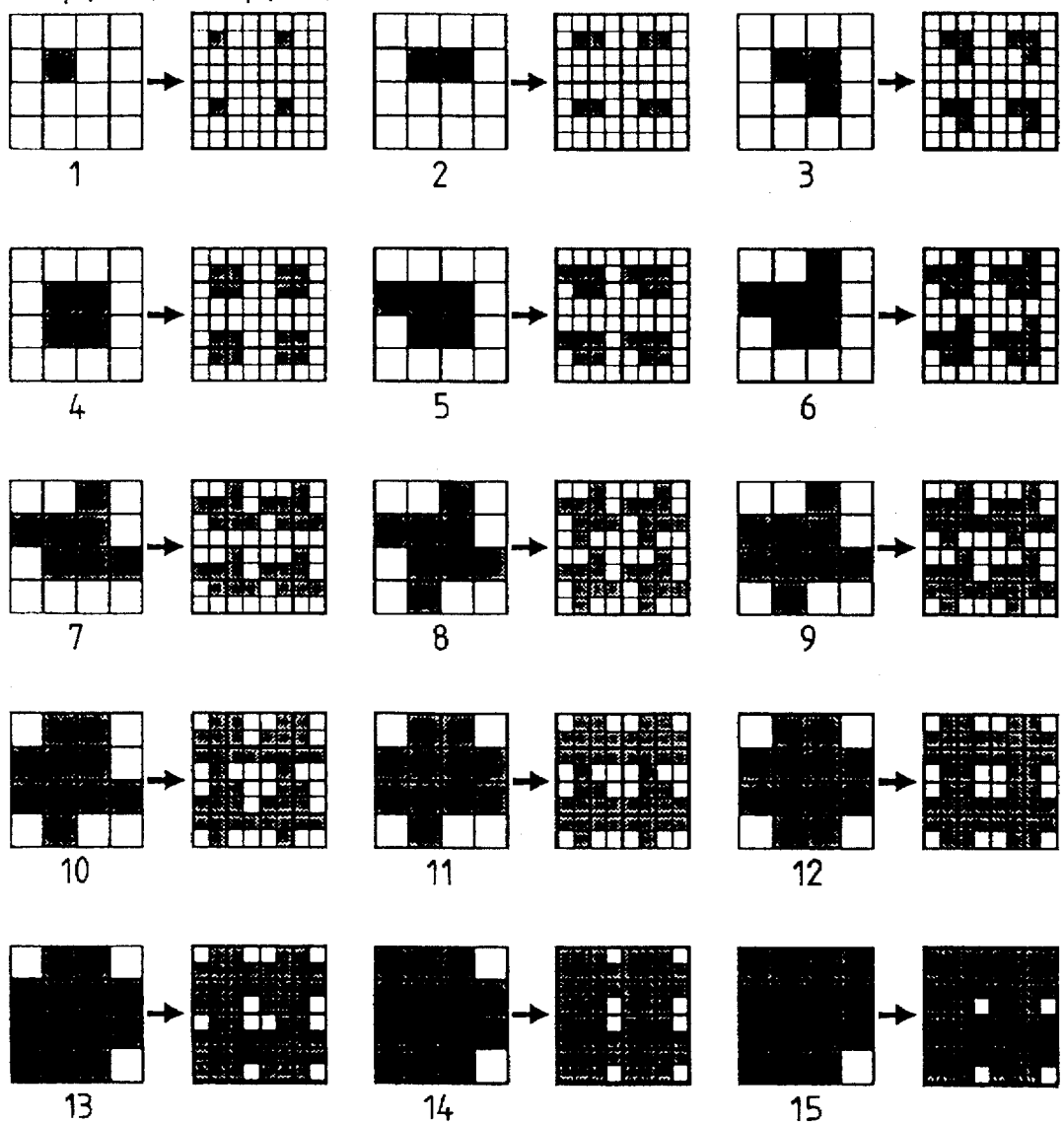
FIG. 17 is a diagram showing a state in which a dither image of 300 dpi has been converted into an image signal of 600 dpi.

Upon conversion, as shown in FIG. 17, the same pattern as the dither pattern of 300 dpi which is constructed by (4×4) dots is repetitively allocated total four times, namely, every twice in each of the main scan and sub scan directions into the corresponding area of 600 dpi which is constructed by (8×8) dots. Thus, the density of the original image is preserved and a finer image of a high picture quality can be obtained.

Figure 18A:
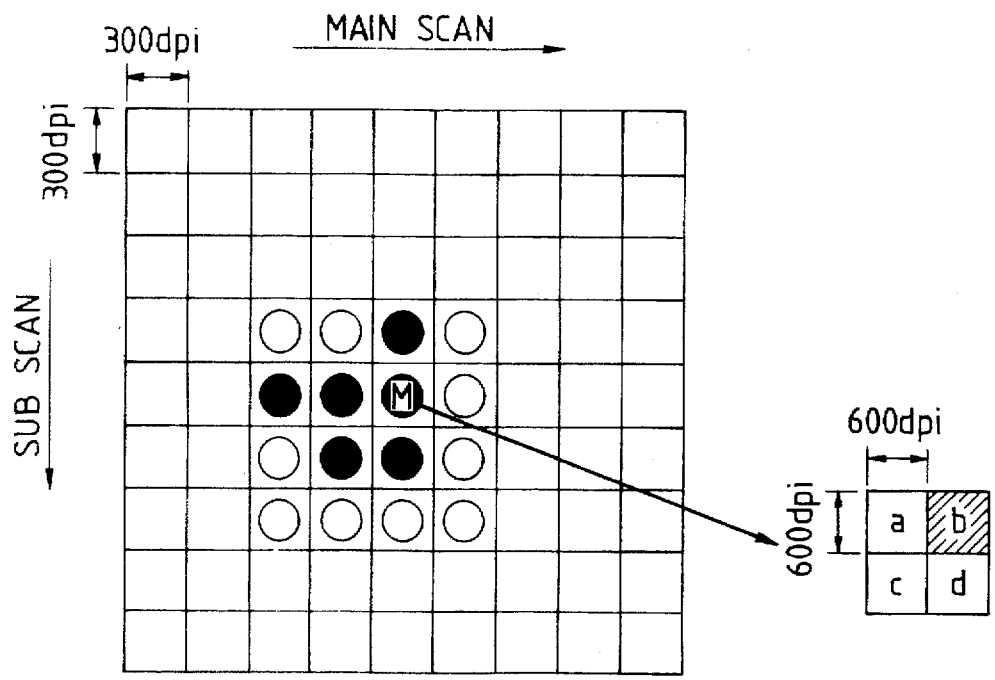
FIGS. 18A and 18B are diagrams each showing an example of the conversion of a dither image.
Figure 18B:
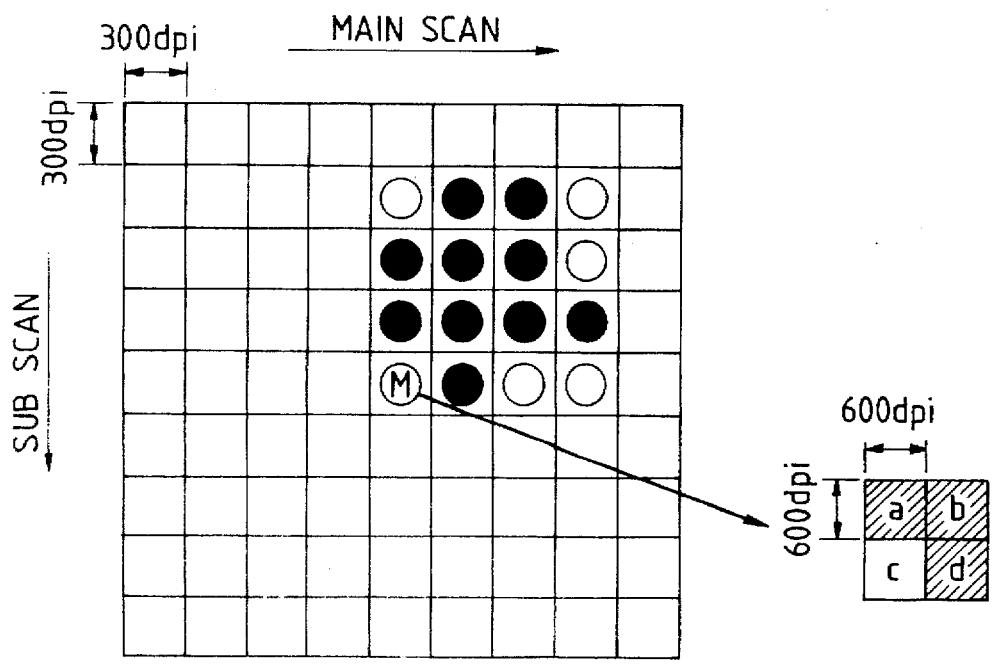

FIGS. 18A and 18B show examples of matching patterns to realize the conversion as mentioned above. In FIGS. 18A and 18B, in the reference region, ● denotes a black dot, ○ shows a blank dot, and the other portions denote that any one of the black dot and the blank dot can be arbitrarily set. The converted image data shows that the hatched portion is printed in black. FIG. 18A shows an example in the case where the value of the dither matrix including the target pixel M is equal to "6". FIG. 18B shows an example in the case where the value of the dither matrix including the target pixel M is equal to "10". The data of the target pixel M is compared with such a number of dot patterns and is determined. Each dither pattern is finally converted as shown in FIG. 17. Now, by setting a matching pattern in which only one black or blank dot is included in the dither matrix of 4×4, namely, a matching pattern such that when the value of the dither matrix is equal to "1" or "15", a range wider than the dither matrix of (4×4) dots is referred in order to prevent an erroneous detection, the conversion can be more accurately executed.

As an order of the conversion, two converted data of a and b are first formed at the odd-number designated lines and two data of c and d are subsequently formed at the even-number designated lines. The signals formed as mentioned above are supplied to the parallel/serial converter 116 through the OR circuit 115.

The above processing timings are substantially the same as those shown in FIG. 9. In the diagram, with respect to the line memories 1 to 9, the signals which are read out from the memories are shown.

On the other hand, the description of the character smoothing logic circuit 114 is omitted here because it is the same as the description made in FIGS. 11 to 15.

In the OR circuit 115, the matching of the densities of the output data of the dither conversion logic circuit 113 and the output data of the character smoothing logic circuit 114 and the OR of the corresponding data are got.

Eight output data of the OR circuit 115 are converted into a serial signal by the parallel/serial converter 116 and the serial signal is sent as an image signal SVDO to the printer engine 201. The image signal SVDO is a signal of a density of 2400 dpi (main scan)×600 dpi (sub scan).

The presence or absence of the process for a dither image and the presence or absence of the process for an image such as characters or figure can be independently controlled. The print controller 202 generates smoothing process designation signals $SON_1$ and $SON_2$ to the signal processing circuit 205 by the designation from the operation panel or by a command from the host apparatus. The presence or absence of the process for characters or figure is controlled by the smoothing process designation signal $SON_1$. The presence or absence of the process for a dither image is controlled by the signal $SON_2$. When "there is no process" is designated in both of the above processes, the VDO signal of 300 dpi for both of the main scan and sub scan from the controller are converted into the data of 600 dpi by simply increasing the densities in both of the main scan and sub scan directions by two times, and the signal of the data of 600 dpi is supplied to the parallel/serial converter 116.

The printer engine 201 modulates the laser beam on the basis of the SVDO signal and executes the above image forming operation.

As described above, by converting the image signal into the data in which the densities in both of the main scan and sub scan directions are increased by two times and by printing the converted data, even with a small memory of 300 dpi, a smooth image of a high picture quality which effectively uses the performance of the printer engine of 600 dpi can be obtained with respect to both of the half tone image and the image of characters, figure or the like. The presence or absence of the converting process for a dither image and the presence or absence of the converting process for an image of characters, figure, or the like can be independently controlled. Therefore, in addition to that the converting processes are executed for both of the half tone image and the image of characters, figure, or the like, an output image according to a taste of the user such as "there is a process for only the half tone image", "there is only a smoothing process of characters or figure", or the like can be obtained.

The above third embodiment has been described with respect to the case where the matching pattern which is compared with the reference pixel is a dither matrix of the fatting type of 4×4. However, the invention is not limited to such a case. For example, by combining with what is called a systematic dither of 8×8 which is constructed by combining four dither matrices of (4×4) as submatrices, a half tone image of a higher picture quality can be obtained. Further, the present invention can be also applied to a density patterning method. In addition, a few kinds of matching matterns as mentioned above are prepared and the logic can be also switched in accordance with an image to be printed or a taste of the user by a command or the like from the printer controller. Although the invention has been described above with respect to the case where the density of the image signal from the printer controller is equal to 300 dpi and the resolution of the printer engine is equal to 600 dpi, the invention is not limited to them. For example, the invention can be also applied to the case of 240 dpi and 480 dpi or the case of 400 dpi and 800 dpi. When the density of the image signal from the printer controller is equal to 300 dpi and the sub scan density of the printer engine is equal to 900 dpi which is three times as large as that in case of 300 dpi, it is also possible to convert one image signal into data of three lines and print them.

(Fourth embodiment)

The third embodiment has been described with respect to the example in which a predetermined dither matrix of 300 dpi is converted into the same pattern of 600 dpi as the pattern of 300 dpi. An example in which the dither pattern of 300 dpi before conversion differs from the dither pattern of 600 dpi after completion of the conversion will now be described as a fourth embodiment. Further, in the fourth embodiment, a dither pattern which is used in a binarizing process that is executed by the printer controller when the converting process for the dither image is "presence" also differs from a dither pattern in case of "absence".

When the converting process to the dither image is "absence", the printer controller 202 generates a bit map data of 300 dpi which has been binarized on the basis of a dither matrix of 8×8 which was optimized so as to obtain a good balance between the gradation and the resolution under a condition such that image data is printed by a laser beam printer of 300 dpi.

Figure 20:
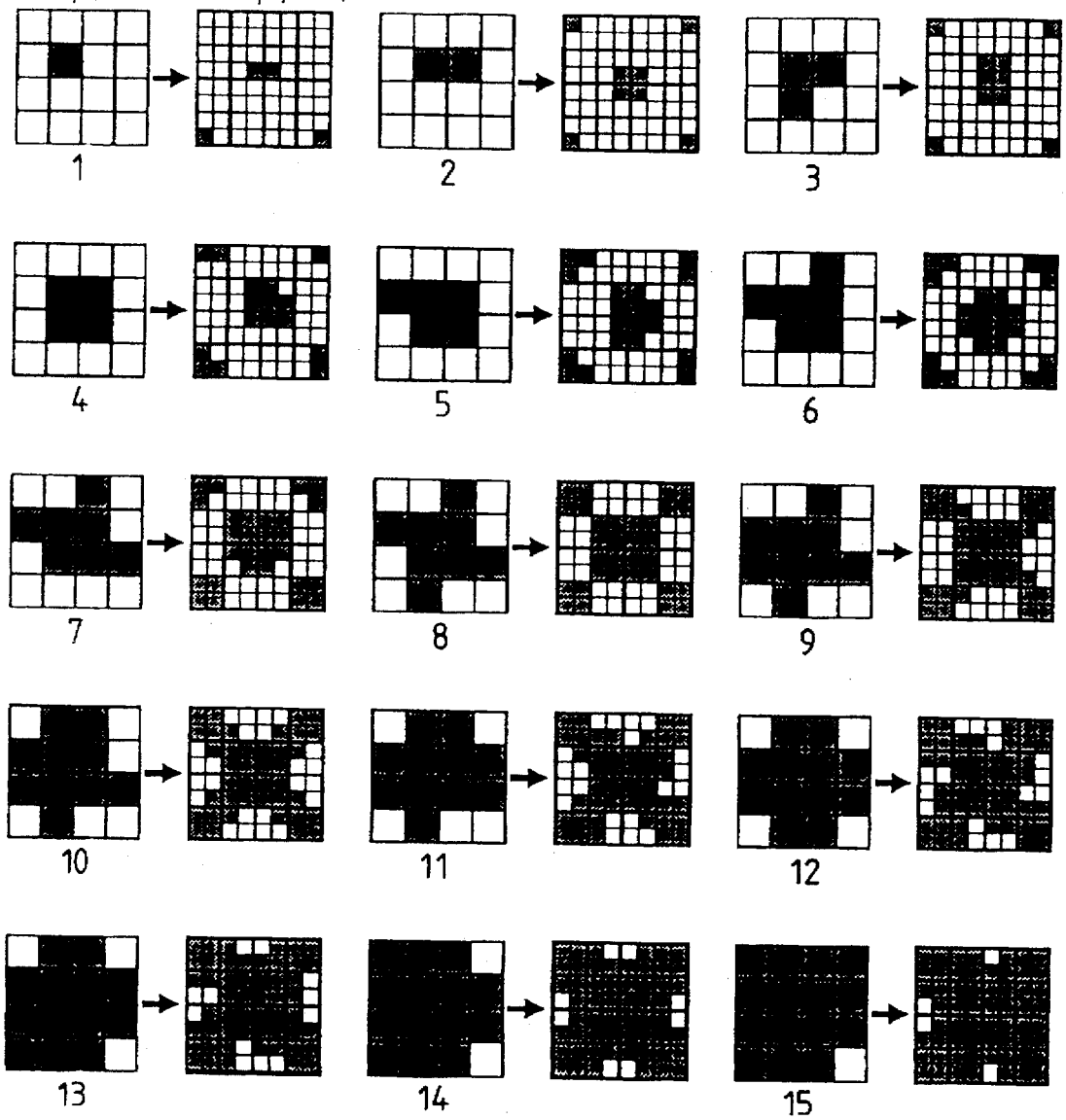
FIG. 20 is a diagram for explaining the conversion of an image signal of a dither image according to the fourth embodiment.

On the other hand, when the converting process to the dither image is "presence", in order to suppress a logic scale for conversion, the density of gradation is converted into 600 dpi, so that adequate gradations can be obtained. Therefore, bit map data of 300 dpi which has been binarized on the basis of the matix which gives priority to the resolution is generated even in case of the same construction of 8×8. Practically speaking, the fatting type dither pattern of 4×4 which has been described in the second embodiment is used as a sub matrix and a systematic dither is formed by combining such four sub matrices. FIG. 19 shows a threshold matrix in this case. In the signal processing circuit 205, the dither image of 300 dpi which has been binarized on the basis of the threshold matrix is converted into the image of 600 dpi. Such a conversion is executed by comparing the dither pattern with a plurality of predetermined matching patterns in a manner similar to the foregoing embodiment. Since the matching patterns have been predetermined on the basis of the dither pattern of the fatting type of 4×4, the logic scale for conversion can be suppressed in spite of the fact that the original image relates to the dither matrix of 300 dpi and 64 (8×8) gradations. The converted data is determined so as to become a dither image of 8×8 in a manner such that the density is preserved on a unit basis of a pattern of 4×4 before conversion and, when the image data is printed by the laser beam printer of 600 dpi, the optimum image can be obtained. FIG. 20 shows a practical dither matrix of 300 dpi of 4×4 before conversion and a practical dither matrix of 600 dpi of 8×8 after completion of the conversion. Since the shapes of patterns before and after the conversion in case of the dither matrix shown in FIG. 20 are fairly different, there is a drawback such that when there is an unprocessed portion, it is relatively conspicuous. However, by setting the pattern of the original image of 300 dpi into a pattern similar to the converted pattern of 600 dpi, the unprocessed portion can be made inconspicuous and an image of a further high picture quality can be also obtained.

By making the patterns before and after the conversion different as shown in the fourth embodiment, a half tone image of a high picture quality can be obtained.

(Fifth embodiment)

The fifth embodiment of the present invention will now be described.

Figure 21:
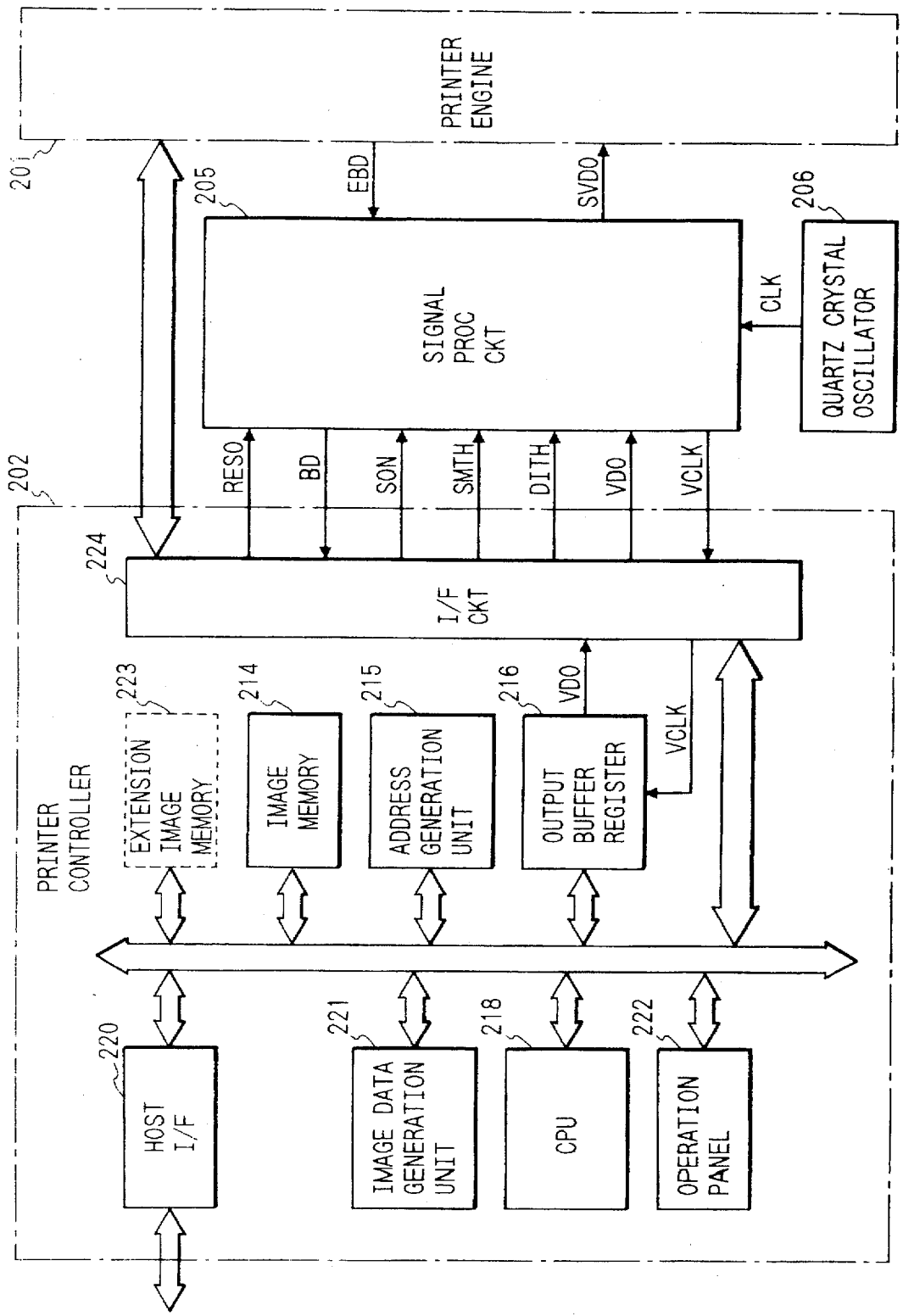
FIG. 21 is a block diagram showing an electric construction of a laser beam printer which is applied to the fifth and sixth embodiments of the invention.

FIG. 21 is a block diagram of a laser beam printer according to the fifth embodiment of the present invention. In the diagram, the same component elements as those shown in FIG. 1 are designated by the same reference numerals and their detailed descriptions are omitted here. Further, the printer controller 202 in FIG. 21 can receive not only the data of 300 dpi but also the data of 600 dpi. The signal processing circuit 205 receives the image signal VDO of 300 or 600 dpi from the printer controller 202 by the transfer clock VCLK and converts the image signal VDO into the smoothed image signal SVDO in which the density in the main scan direction is equal to 2400 dpi and the density in the sub scan direction is equal to 600 dpi and transmits the image signal SVDO to the printer engine 201'.

In FIG. 21, reference numeral 223 denotes an extension image memory which is set as an option. The printer controller 202 has the image memory 214 as a standard memory to develop the bit map data. The image data of 300 dpi can be handled in the standard image memory 214. By attaching the extension image memory 223, the printer controller 202 can handle the image data of 600 dpi. In the above construction, the CPU 218 judges whether the extension image memory 223 has been attached or not. When the extension image memory 223 is attached, the printer controller 202 operates as a controller of 600 dpi. When the extension image memory 223 is not loaded, the printer controller 202 operates as a controller of 300 dpi. The CPU 218 always monitors an amount of image data of each page from the host apparatus. Even when the extension image memory 223 is installed, in the case where it is judged that so long as the bit map data is developed at a rate of 600 dpi, the processing time is too slow for a throughout of the printer engine, the bit map data is developed at a rate of 300 dpi with regard to such a page. Further, the CPU 218 generates a signal RESO indicating that the printer controller is at present operating in which one of the mode of 600 dpi and the mode of 300 dpi. When RESO="H", this means that the printer controller is at present in the operating mode of 600 dpi. When RESO="L", this means that the printer controller is at present in the operating mode of 300 dpi. The RESO signal is supplied to the signal processing circuit 205.

Figure 22:
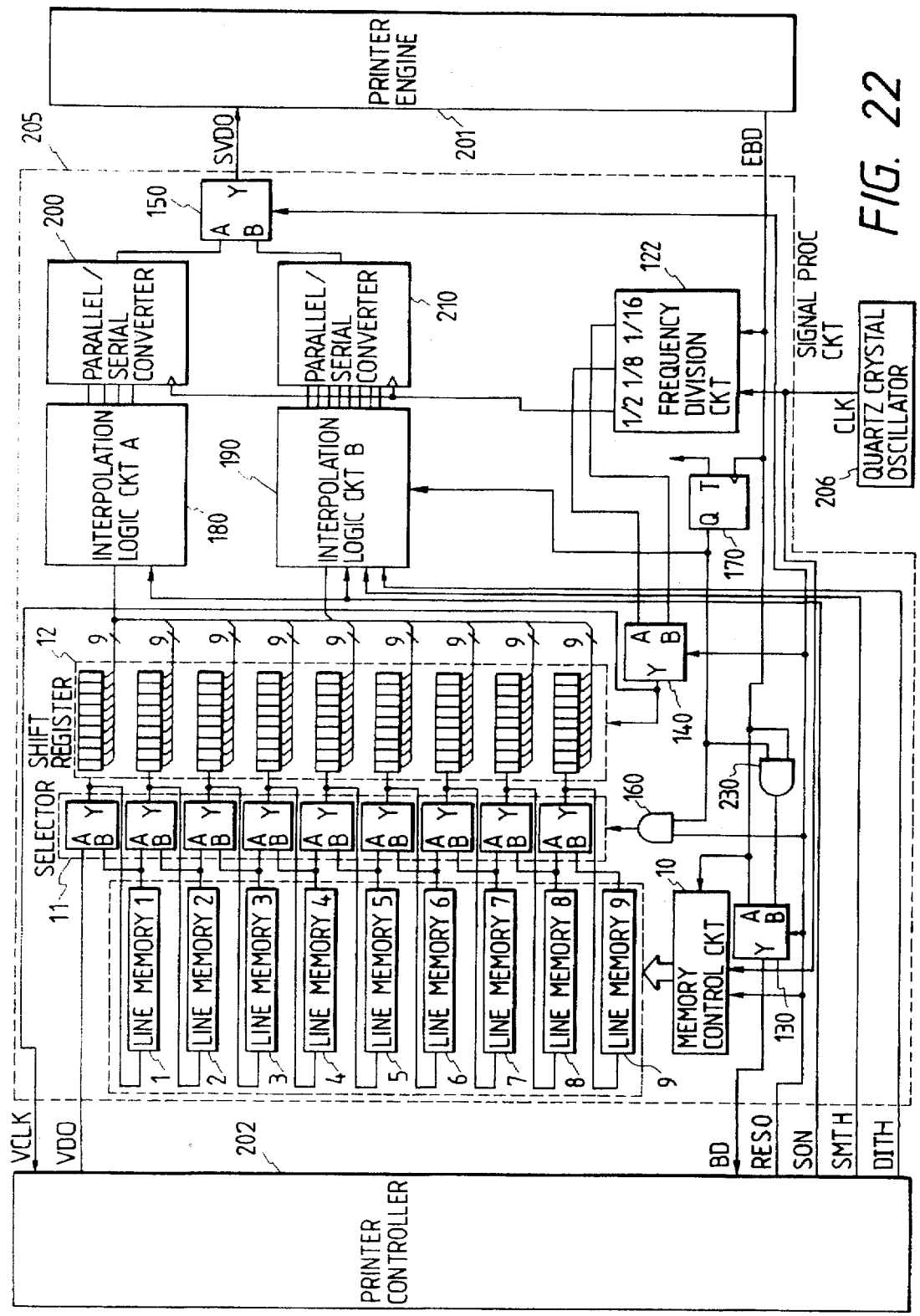
FIG. 22 is a block diagram showing a construction of a signal processing circuit 205 in FIG. 21.

FIG. 22 is a block diagram of the signal processing circuit 205. In FIG. 22, the same component elements as those shown in FIG. 2 are designated by the same reference numerals. In FIG. 22, reference numerals 1 to 9 denote the line memories to store the image signals from the printer controller 202. Each of the line memories has a capacity such that it can store the image signal of 600 dpi by an amount of one main scan line. Reference numeral 10 denotes the memory control circuit to control the writing and reading operations of the line memories 1 to 9; 11 the selectors each for selecting either one of the two A and B inputs and outputting to the terminal Y; 12 the shift registers of 9×9 bits each of which outputs the image data while shifting the image data everytime the clock is received; 130 to 150 selectors similar to the selectors 11; 160 and 230 AND circuits; 170 a toggle flip-flop (T-FF); and 180 an interpolation logic circuit A having a function to convert the image signal from the printer controller 202 into the signal of 2400 dpi (main scan)×600 dpi (sub scan) so long as the image signal density is equal to 600 dpi. Reference numeral 190 denotes an interpolation logic circuit B having a function to convert the image signal from the printer controller 202 into the signal of 2400 dpi (main scan)×600 dpi (sub scan) or the signal of 600 dpi (main scan)×600 dpi (sub scan) so long as the image signal density is equal to 300 dpi. Reference numeral 200 denotes a parallel/serial converter for converting parallel 2-bit output signals from the interpolation logic circuit A 180 into the serial signal and generating the serial signal. Reference numeral 210 denotes a parallel/serial converter for converting parallel 4-bit output signals from the interpolation logic circuit B 190 into the serial signal and generating the serial signal. Reference numeral 122 denotes a frequency dividing circuit for frequency dividing the clock signal CLK from the quartz crystal oscillator 206 every main scan synchronously with the horizontal sync signal EBD from the printer engine 201 and generating clock signals of frequency division ratios of ½, ⅛, and ¹⁄₁₆.

In the above construction, the printer controller 202 generates the image signal VDO of a density of 600 or 300 dpi to the signal processing circuit 205. The density of the image signal is indicated by the signal RESO as mentioned above. When RESO="H", this means that the density of VDO is equal to 600 dpi. When RESO="L", this means that the density of VDO is equal to 300 dpi.

Figure 23:
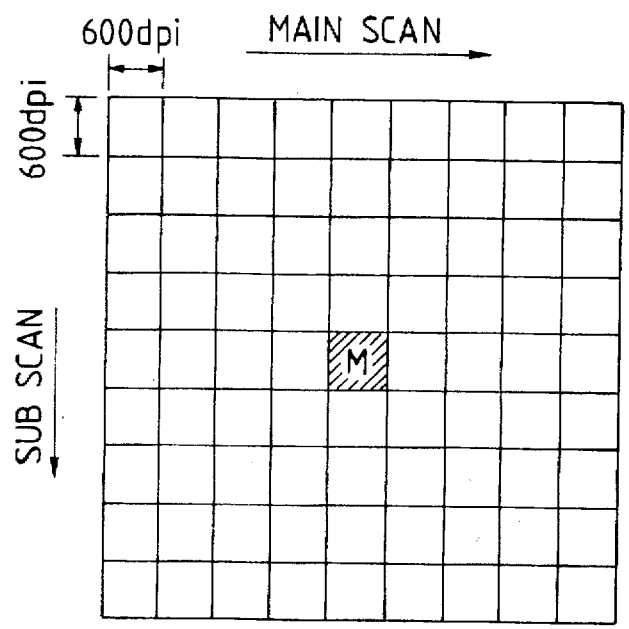
FIG. 23 is a diagram for explaining an interpolating process in an interpolating circuit 180.
Figure 24:
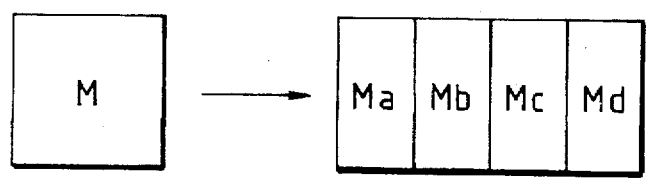
FIG. 24 is a diagram for explaining a density converting process in a target pixel M in FIG. 23.
Figure 25A:
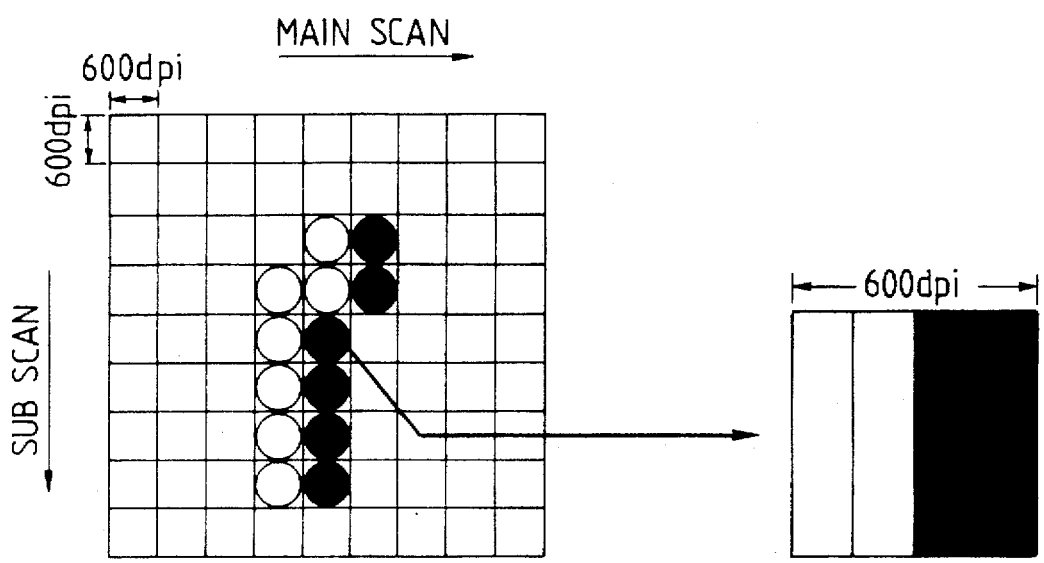
FIGS. 25A and 25B are diagrams for explaining examples of a smoothing process according to the fifth embodiment.
Figure 25B:
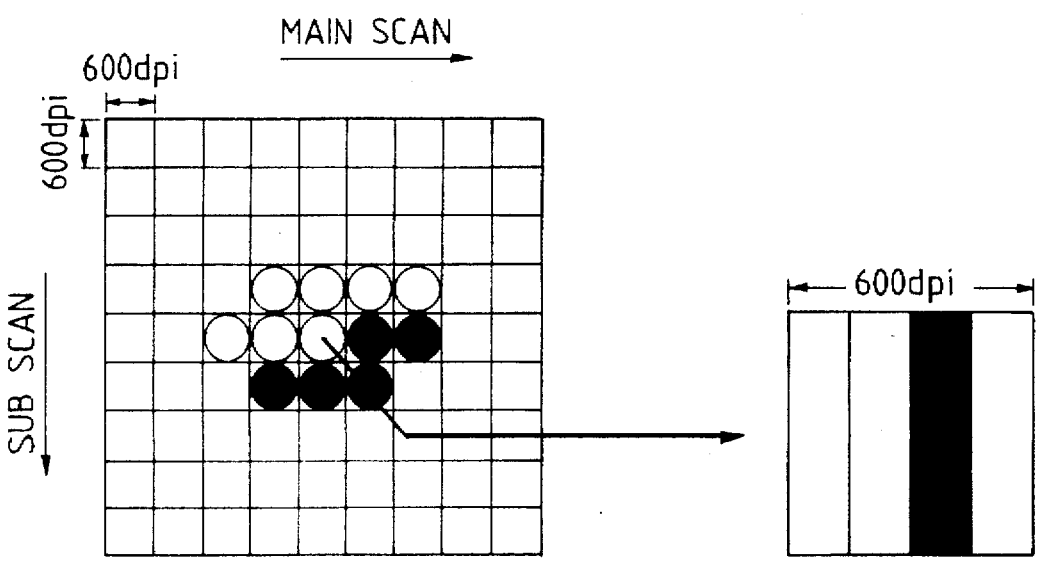
Figure 26:
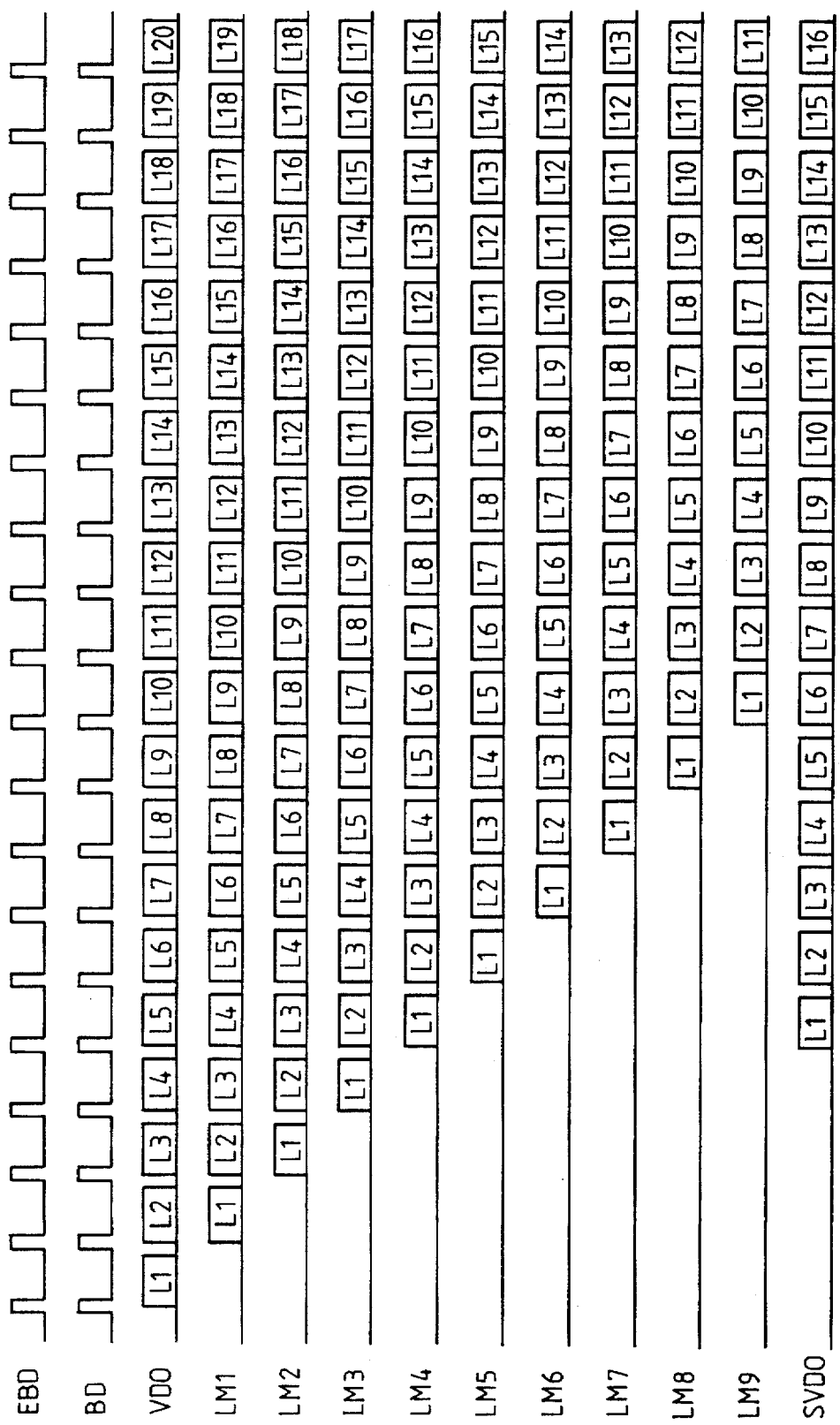
FIG. 26 is a timing chart for explaining the operation in case of using an interpolation circuit 180 of the signal processing circuit 205 shown in FIG. 22.
Figures 27A, 27B, 27C:
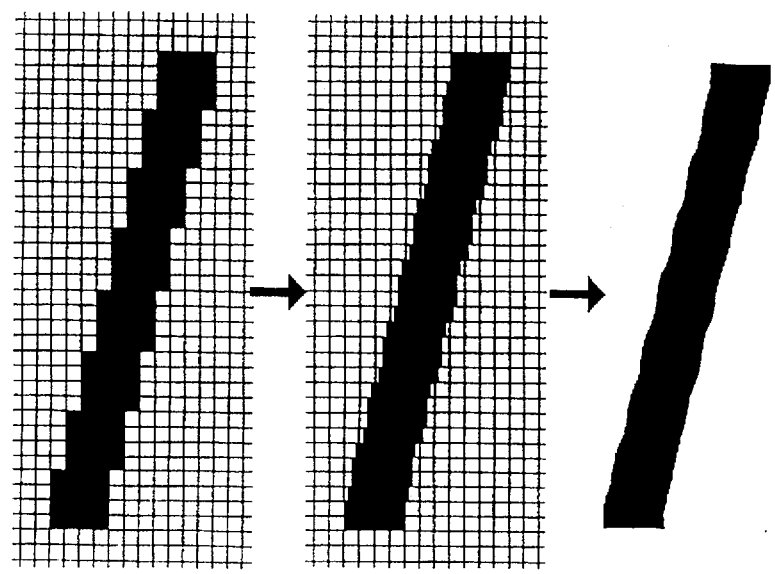
Figure 28A:
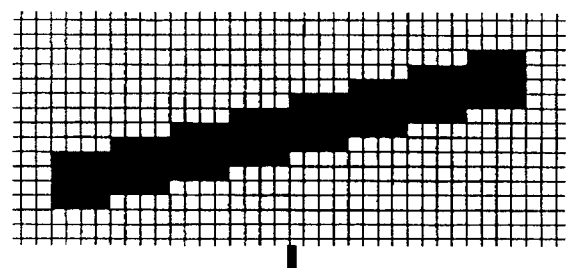
Figure 28B:
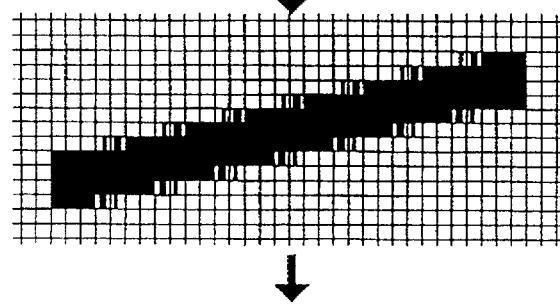
Figure 28C:

The operation of the signal processing circuit 205 will now be described. First, the case where the density of the VDO signal is equal to 600 dpi, namely, where the extension memory is attached to the printer controller and the printer controller operates as a controller of 600 dpi will now be described. In this instance, the A inputs of all of the selectors 11 and 130 to 150' are selected by the RESO signal. The horizontal sync signal EBD from the printer engine 201 is transmitted as it is as a horizontal sync signal BD to the printer controller 202. Each time the horizontal sync signal BD is supplied, the printer controller 202 transmits the VDO signal of an amount of one main scan line synchronously with the image clock signal VCLK which is transmitted from the signal processing circuit 205. The VCLK signal is a signal which is obtained by frequency dividing the output signal CLK of the quartz crystal oscillator 206 into ⅛ synchronously with the EBD signal by the frequency dividing circuit 122. The VDO signal of the first line supplied to the signal processing circuit 205 is sent to the first bit of the shift register 12 and is also written into the line memory $LM_1$. In the next main scan, the VDO signal at the same position of the first line which has been stored in the line memory $LM_1$ is read out at the same time with the input of the VDO signal of the second line and those VDO signals are supplied to the first and second bits of the shift register 12, respectively. The VDO signal of the second line supplied is written into the line memory $LM_1$. The signal read out from the line memory $LM_1$ is written into the same address in the line memory $LM_2$. In this manner, the VDO signal which is supplied every line is written and read out while being shifted to the line memories $LM_1 \rightarrow LM_2 \rightarrow \ldots \rightarrow LM_9$. Consequently, the VDO signals of nine continuous lines are stored in the line memories $LM_1$ to $LM_9$. For instance, a static RAM can be used as each of the line memories. Output signals of the line memories $LM_1$ to $LM_8$ and the VDO signal from the printer controller 202 are supplied to the shift registers 12. The image signals of total 81 dots of 9 dots (main scan)×9 lines (sub scan) are generated from the shift registers 12 while being shifted by the VCLK signal. The image signals of 81 dots are supplied to the interpolation logic circuit A 180. As shown in FIGS. 23 and 24, with reference to the image signals of the peripheral pixels around the target pixel M, the interpolation logic circuit A 180 converts the image signal into the signals $M_a$, $M_b$, $M_c$, and $M_d$ which are smoothed by increasing the density in the main scan direction of the image signal for the target pixel M by four times. The above conversion is executed by comparing the output data of the shift register 12 with a plurality of predetermined dot patterns. The dot patterns are used to extract a feature of the target pixel M. For instance, in case of FIG. 25A, the target pixel M is regarded as a part of an oblique line near the vertical line (sub scan direction), so that it is converted into the data shown in the diagram. In case of FIG. 25B, the target pixel M is regarded as a part of an oblique line near the lateral line (main scan direction), so that it is converted into the data shown in the diagram. In FIGS. 25A and 25B, ● indicates a black dot, ○ shows a blank dot, and the other portions in the reference region denote that any one of the black and blank dots is arbitrarily set. The data of the target pixel M is compared with such a number of dot patterns and determined. An algorithm for converting the image signal for an oblique line near the vertical line differs from that in case of an oblique line near the lateral line. In case of the oblique line near the vertical line, a conversion such as to add or delete dots on a unit basis of 2400 dpi so as to reduce a level difference between the target pixel and the adjacent pixel is executed. On the other hand, in case of the oblique line near the lateral line, small dots are added as densities on a unit basis of 2400 dpi to the portions near the pixels forming a level difference. By adding the small dots as densities, the level difference portion of the printed image become blur and the printed image becomes smooth due to the characteristics of an electrophotograph, so that the smoothing effect is obtained. The signals $M_2$ to $M_d$ which have been decided as mentioned above are converted into the serial signal by the parallel/serial converter 200. The serial signal is transmitted as an image signal SVDO to the printer engine 201 through the selector 150. Therefore, the image signal SVDO is a signal of a density of 2400 dpi (main scan)×600 dpi (sub scan). In the case where "there is no smoothing process" is designated from the printer controller 202 by the smoothing processing designation signal SON, the VDO signal in which the densities of both of the main scan and sub scan are equal to 600 dpi is sent as an SVDO signal to the printer engine 201 as it is. Since the above processes are executed, the VDO signal from the printer controller 202 is delayed by a time corresponding to five dots in the main scan direction and by a time corresponding to four lines in the sub scan direction until it is actually printed. Therefore, it is necessary that the printer controller generates the VDO signal at a timing in consideration of such a delay. FIG. 26 shows the timings of the above signals on the assumption that the VDO signals from the printer controller are sequentially set to $L_1$, $L_2$, . . . from the first main scan line. In the diagram, the signals which are read out from the memories are shown with regard to the line memories $LM_1$ to $LM_9$. In the printer engine 201, the laser beam is modulated on the basis of the SVDO signal and the above image forming operation is performed. FIGS. 27A to 27C and 28A to 28C are diagrams schematically showing examples of the images which are printed as a result of the above processes. FIGS. 27A and 28A show the images which are actually printed by the original data of 600 dpi which is transmitted from the controller. FIGS. 27B and 28B show the images which are actually printed by the data converted by the signal processing circuit. FIGS. 27C and 28C show the images which are actually printed by the data shown in FIGS. 27B and 28B. One element of the lattice corresponds to one unit of 600 dpi. By increasing the density in the main scan direction of the image signal by four times as mentioned above, an image of a high picture quality can be obtained.

Figure 29:
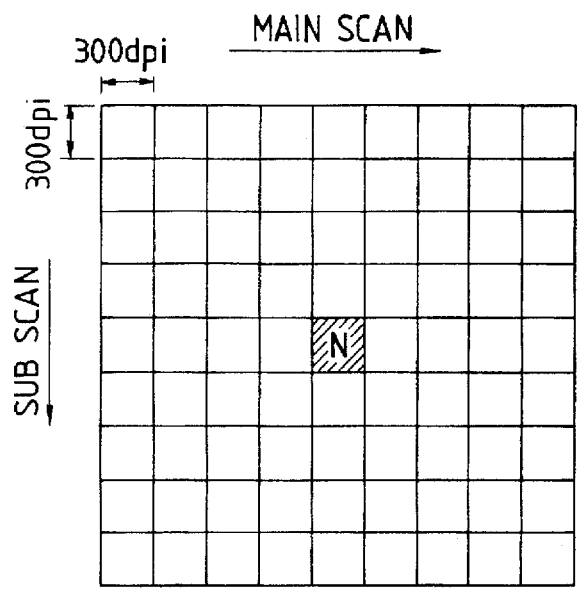
FIG. 29 is a diagram for explaining an interpolating process in the interpolation circuit 190.
Figure 30:
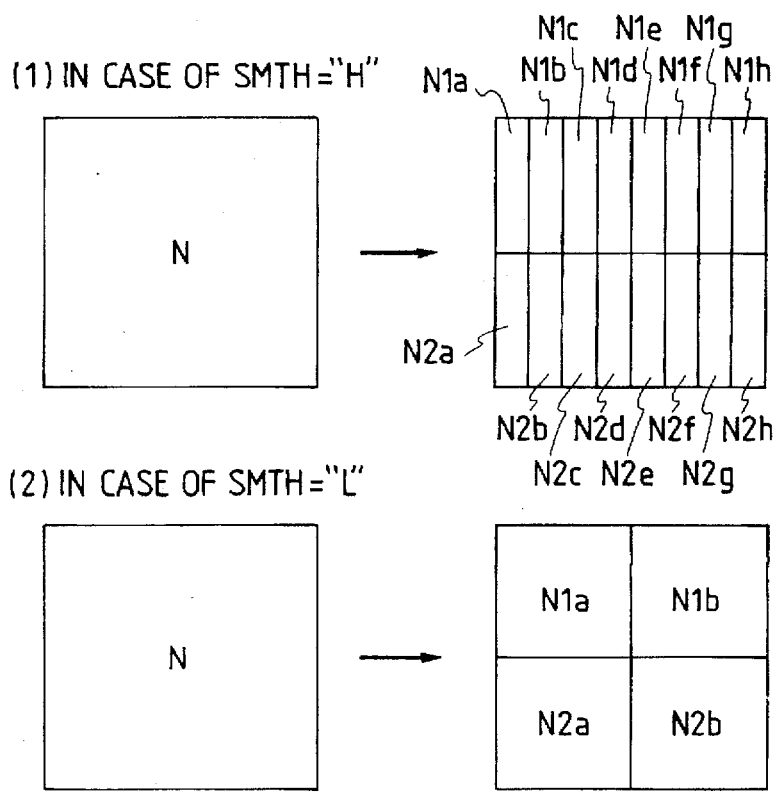
FIG. 30 is a diagram for explaining a density converting process in a target pixel N in FIG. 29.

The operating in the case where the density of the VDO signal from the printer controller 202 is equal to 300 dpi, that is, no extension image memory is attached to the printer controller and the printer controller operates as a controller of 300 dpi will now be described with reference to FIG. 22. The B inputs of all of the selectors 130 to 150 are selected by the RESO signal in this case. In a manner similar to the case where the density of the VDO signal is equal to 600 dpi as mentioned above, the printer controller 202 transmits the VDO signals of one main scan line synchronously with the image clock signal VCLK which is sent from the signal processing circuit 205 everytime the horizontal sync signal BD is supplied. The BD signal in this case, however, is a BD signal which is equivalent to the signal in case of the printer engine of 300 dpi which is obtained by thinning out the EBD signal from the printer engine every other line. The VCLK signal is obtained by frequency dividing the oscillation clock from the quartz crystal oscillator 206 into $1/16$ by the frequency dividing circuit 122. Since an amount of data of one line of the VDO signal of 300 dpi is equal to ½ of that in case of 600 dpi, by constructing the apparatus as mentioned above, the transmission time of the VDO signals of one line from the printer controller is equal to that in the case where the density of the foregoing VDO signal is equal to 600 dpi. The VDO signal $L_1$ of the first line supplied to the signal processing circuit 205 is sent to the first bit of the shift register 12 through the selector 11 and is also written into the line memory $LM_1$. When the density of the VDO signal is equal to 300 dpi, the selector 11 is alternately switched by the EBD signal from the printer engine. That is, the A inputs are selected at the odd-number designated lines when they are seen on a 600 dpi unit basis from the printer engine, while the B inputs are selected at the even-number lines. Therefore, in the next main scan, the VDO signal $L_1$ at the first line which is read out from the line memory $LM_1$ is again supplied to the first bit of the shift register 12 and is also written into the line memory $LM_1$. In this instance, since the BD signal is not sent to the controller, the controller stops the transmission of the VDO signal for periods of time corresponding to the even-number designated lines. Further, in the next main scan, the VDO signal $L_2$ of the second line for the controller is supplied from the printer controller. At the same time, the VDO signal at the same position of the first line which has been stored in the line memory $LM_1$ is read out. The above VDO signals are sent to the first and second bits of the shift register 12, respectively. The VDO signal at the second line supplied is written into the line memory $LM_1$. The signal read out from the line memory $LM_1$ is written into the same address in the line memory $LM_2$. As mentioned above, the writing and reading operations of the VDO signal of the same line are executed every twice for each of the line memories $LM_1$ to $LM_9$ and the VDO signals are supplied into the shift register 12. Consequently, the same image signals of nine lines are continuously generated from the shift registers 12 for a period of time corresponding to two main scan lines. Those image signals are supplied to the interpolation circuit 190. As shown in FIGS. 29 and 30, with reference to the image signals of the peripheral pixels around the target pixel N, the interpolation circuit 190 converts the density of the image signal for the target pixel N. The logic for conversion can be selected by a smoothing processing designation signal SMTH and a dither processing designation signal DITH from the printer controller 202. The signal SMTH can be designated from the operation panel or by an application software in accordance with a taste of the user.

The smoothing process designation signal SMTH designates the density in the main scan direction of the converted image signal. In the interpolation circuit 190, when SMTH=

Figure 31A:
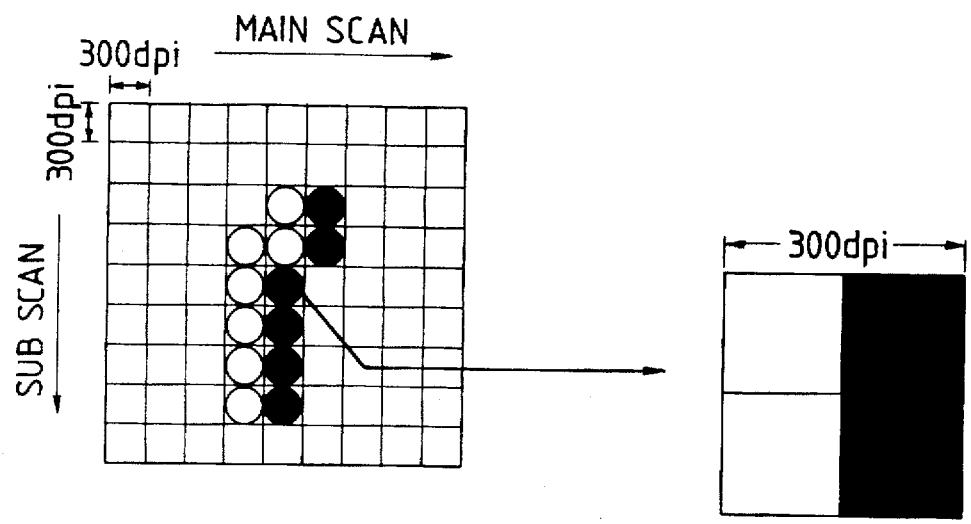
FIGS. 31A and 31B are diagrams each for explaining an example of a smoothing process at a density of 600×600 dpi.
Figure 31B:
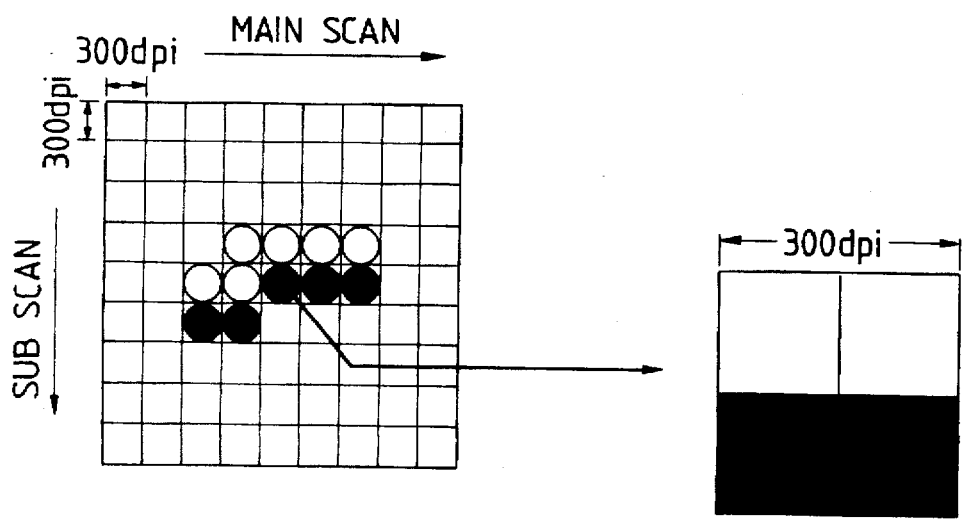
Figure 33:
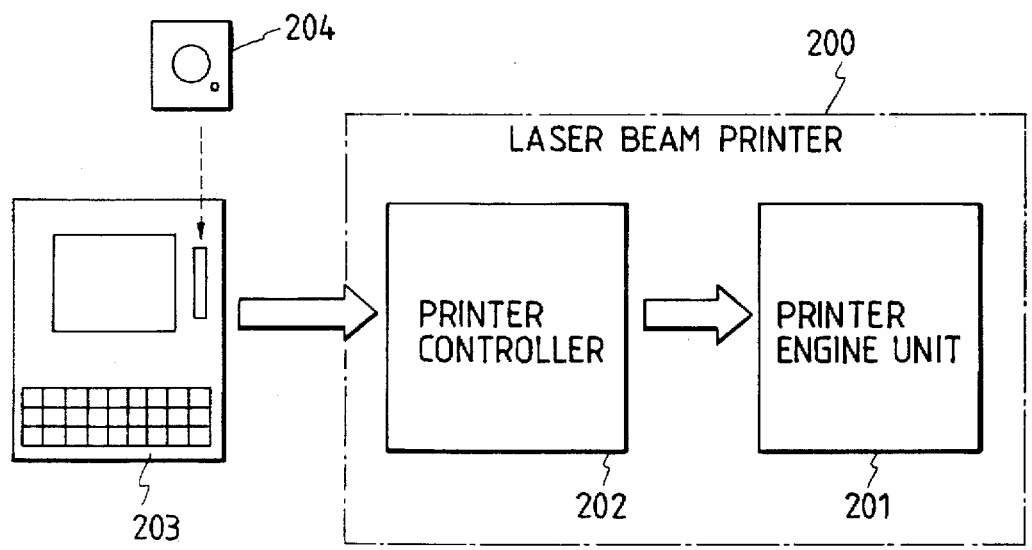
FIG. 33 is a block diagram showing an example of a construction near a laser beam printer.
Figure 35:
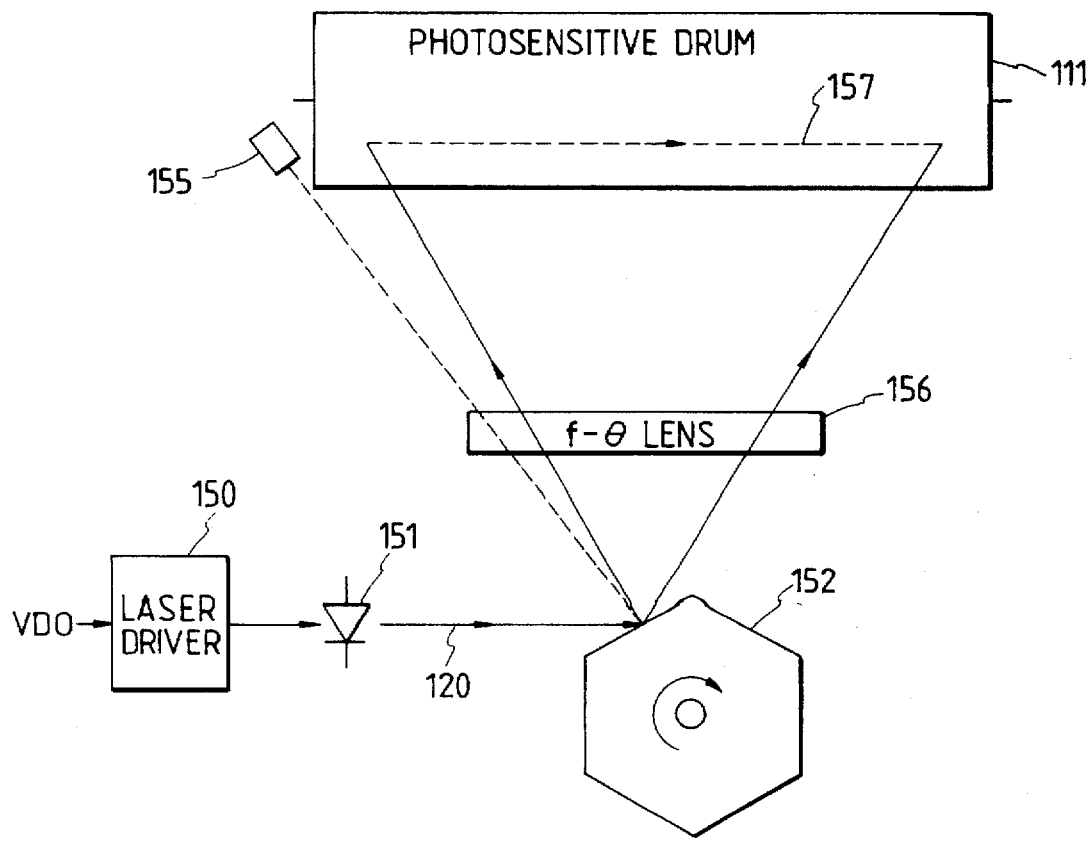
FIG. 35 is a diagram schematically showing a construction of a laser beam printer.
Figure 34:
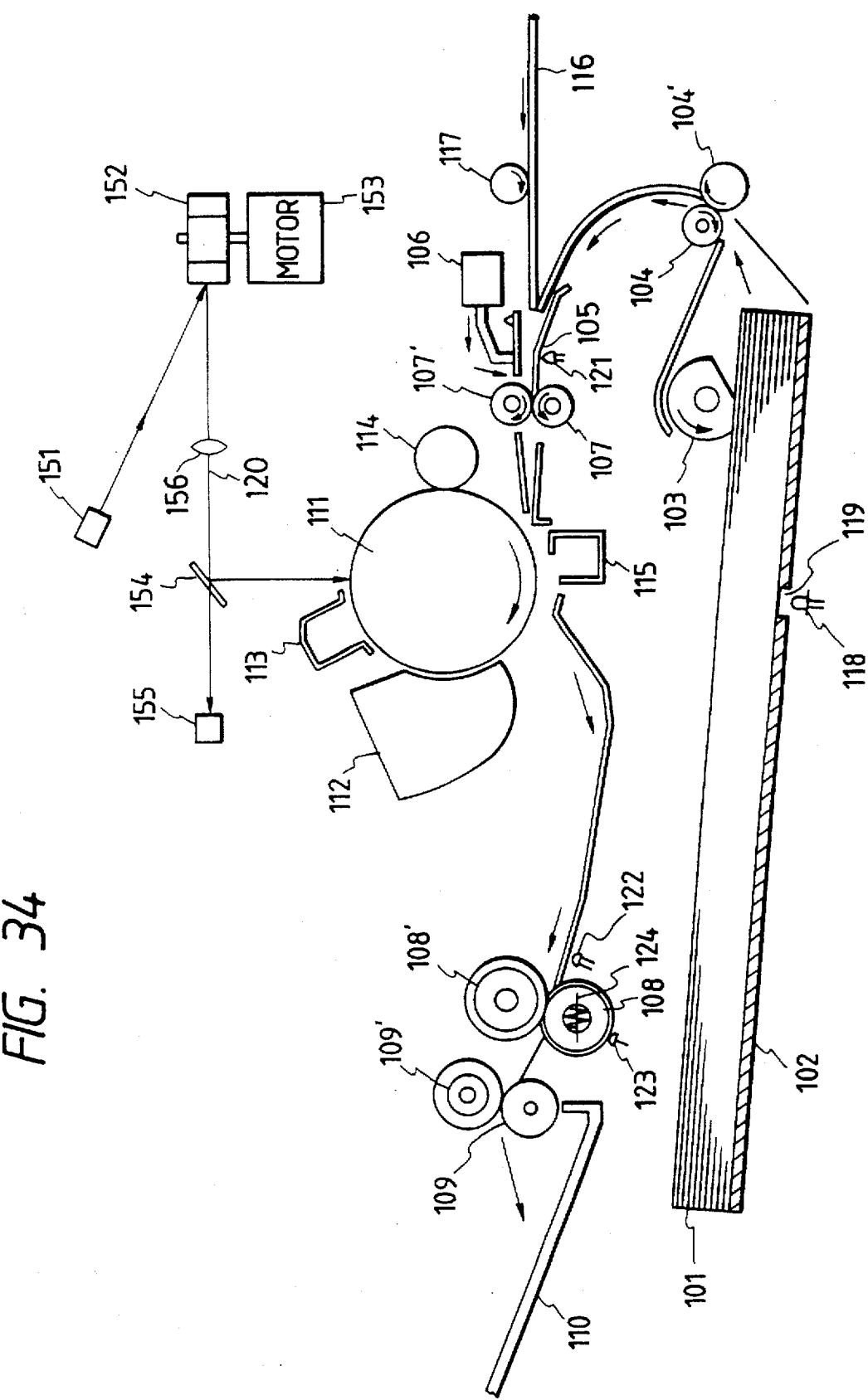
FIG. 34 is a diagram showing a mechanical construction of a laser beam printer.
Figure 36:
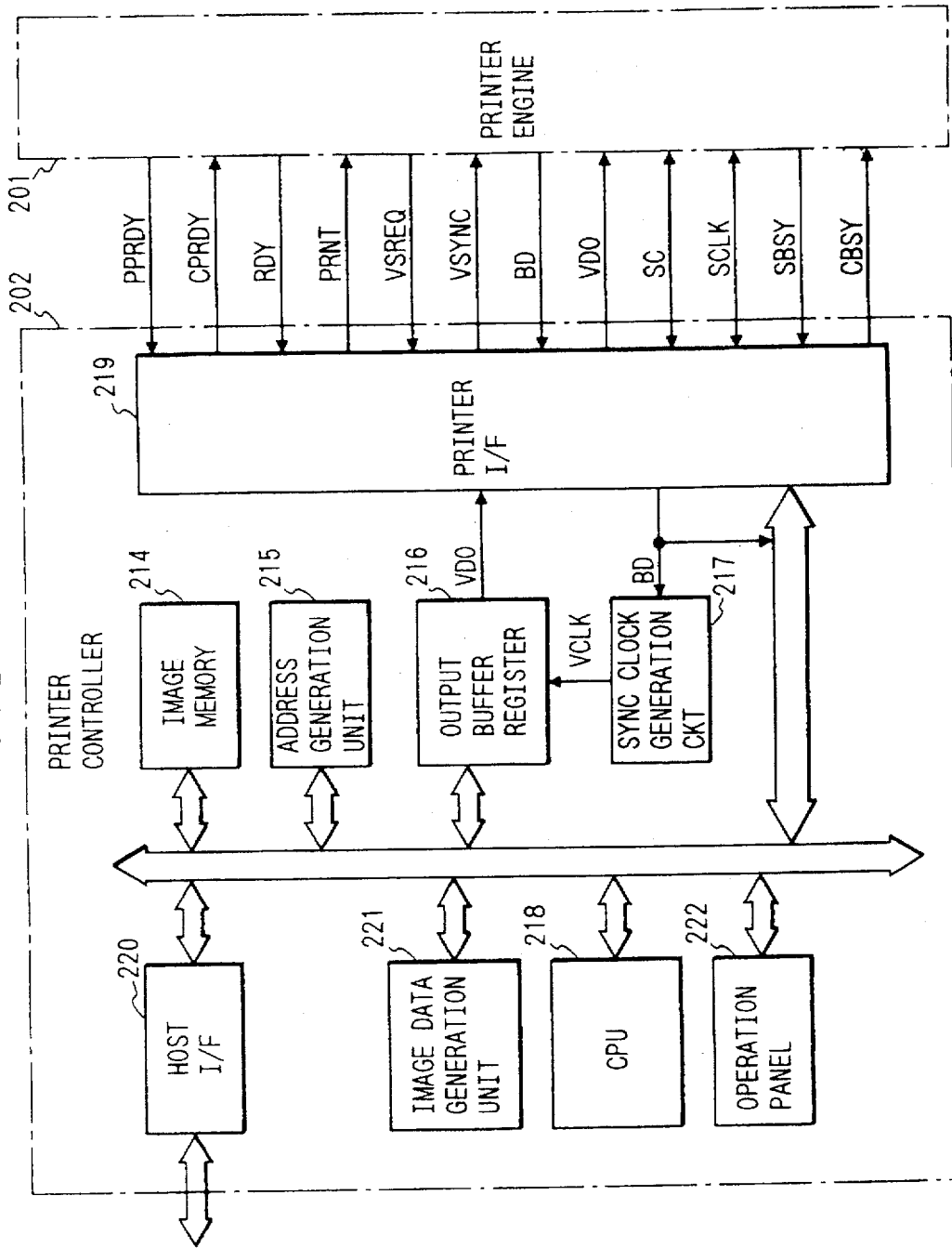
FIG. 36 is a block diagram showing an electric construction of a laser beam printer according to the prior art.

"H", the image signal for the target pixel N is converted into the signal which has been smoothed by increasing the density in the main scan direction by eight times and by increasing the density in the sub scan direction by two times, that is, into the signal of the density of 2400 dpi (main scan)×600 dpi (sub scan). When SMTH="L", on the other hand, the image signal for the target pixel N is converted into the signal in which the densities in both of the main scan and sub, scan directions are increased by two times, namely, into the signal in which the densities for both of the main scan and sub scan are set to 600 dpi. In a manner similar to the foregoing case of 600 dpi, the above conversion is executed by comparing the output data of the shift register 12 with a plurality of predetermined dot data. The dot pattern in this case, however, is based on a unit of 300 dpi. An example of the dot patterns in the case where SMTH="H" is substantially the same as that shown in FIG. 13. FIGS. 31A and 31B show examples of the dot patterns when SMTH="L". As for the order of the conversion, two data of $N_{1a}$ and $N_{1b}$ are first produced at the odd-number designated lines and two data of $N_{2a}$ and $N_{2b}$ are subsequently formed at the even-number designated lines in a manner similar to that mentioned above.

The dither processing designation signal DITH is a signal to designate whether the converting process is executed to a dither image or not. The converting process for the dither image is executed for a dither image having a predetermined growing pattern. The above conversion is substantially the same as the conversion described in the third embodiment mentioned above. The dither pattern of 300 dpi and 4×4 shown in FIG. 17 is converted into the dither pattern of 600 dpi and 4×4, so that the dither image of a high picture quality can be derived.

The signals produced by the interpolation circuit 190 as mentioned above are converted into the serial signal by the parallel/serial converter 210. The serial signal is transmitted as an image signal SVDO to the printer engine 201 through the selector 150. When "there is no smoothing process" is designated from the printer controller 202 by the smoothing process designation signal SON, the VDO signal in which the densities for both of the main scan and sub scan are equal to 300 dpi is converted into the SVDO signal at a rate of 600 dpi by increasing the densities in both of the main scan and sub scan directions by two times. The converted SVDO signal is sent to the printer engine 201. The timings for the above signals are substantially the same as those shown in FIG. 9. FIGS. 14 and 15 show examples of the images which are printed when SMTH="H". In the above process, small dots of a 2400 dpi unit are added as densities to the portions near the pixels forming a level difference in case of an oblique line near the lateral line and the boundary is made blur, thereby obtaining the smooth image. However, when the operator doesn't want to execute such a process, by setting SMTH="L", the density mode of 600×600 dpi is set, so that a sharp image of 600 dpi can be obtained although a degree of smoothness is slightly low. By converting the density of the image signal as mentioned above, even with a small memory of 300 dpi, an image of a high picture quality which can effectively use the performance of the printer engine of 600 dpi can be also obtained.

According to the laser beam printer of the fifth embodiment as described above, the controller produces the image data at a density of 300 or 600 dpi and converts the image signal into the signal of a high density by the signal processing circuit and prints the image data in any one of the densities of 300 dpi and 600 dpi, so that an excellent image can be obtained.

Although the embodiment has been described with regard to the case where the density of the image signal from the printer controller is set to 300 dpi and 600 dpi, the present invention is not limited to such a case. For instance, the invention can be also applied to the case of 240 dpi and 480 dpi or the case of 400 dpi and 800 dpi. Further, when the printer engine can switch the resolution by a command from the controller, it is also possible to construct in a manner such that the signal processing circuit can cope with each resolution of 240, 300, 400, 480, 600, and 800 dpi, and for instance, when the densities of the image signals from the controller are set to 240, 300, and 400 dpi, the density in the main scan direction is increased by eight times and the density in the sub scan direction is increased by two times, and when the densities of the image signals are set to 480, 600, and 800 dpi, the density in only the main scan direction is increased by four times, and the converted data is printed. Although the embodiment has been described with respect to the example in which when the density of the image signal from the controller is equal to 300 dpi, the image signal is converted into the data of 600 dpi whose scan line density is twice as large as that in case of 300 dpi and the converted data is printed, the present invention is not limited to such an example. For instance, a printer engine of 900 dpi is used and the image data is converted into the data of 900 dpi whose scan line density is three times as large as that in case of 300 dpi and the converted data is printed.

(Sixth embodiment)

The above fifth embodiment has been described with respect to the example in which the CPU of the printer controller judges whether the extension image memory 223 has been attached or not, and when the extension image memory is attached, the printer controller operates as a controller of 600 dpi, and when the extension image memory 223 is not attached, the printer controller 202 operates as a controller of 300 dpi. In the sixth embodiment of the present invention, an example in which the resolution can be designated by a command from the host apparatus or by operating the operation panel by the operator will now be described. Such an example is effective in case of paying an importance to the printing speed as will be explained hereinbelow. Even in the case where the extension image memory is attached to the printer controller and an enough large memory capacity to develop the image data of 600 dpi is assured, in order to develop the image data of 600 dpi, a time which is four times as long as that in case of 300 dpi is also required. This is because the capacity of the image data is increased by four times as compared with that in case of 300 dpi. Therefore, when the printing speed has a preference to the picture quality, it is better to develop the image data at a rate of 300 dpi.

The operation of the controller in case of designating the resolution by operating the operation panel by the operator will now be described with reference to a flowchart of FIG. 32.

First, the CPU judges whether the extension image memory has been attached or not (step S1). If YES, a check is made to see if the density mode of 600 dpi has been selected by the operation panel or not (step S2). If YES (when the extension image memory is attached, the initial value is set to 600 dpi and the density mode of 600 dpi is designated so long as the operator doesn't designate a desired mode in particular), the operating mode of the controller is set to 600 dpi (step S3). When the density mode of 300 dpi is selected in step S2, the operating mode of the controller is set to 300 dpi (step S6). On the other hand, when no extension image memory is set in step S1 as well, a check is also made to see if the 600 dpi mode has been selected by the operation panel or not (step S4). When the 600 dpi mode is selected, the image data of 600 dpi cannot be developed so long as the extension image memory is not provided. Therefore, a message of "since the memory is insufficient, the controller operates in the 300 dpi mode" or the like is displayed (step S5). The operating mode of the controller is set to the 300 dpi mode (step S6). When the 300 dpi mode is selected in step S4 (when no extension image memory is attached, the initial value is set to 300 dpi and the 300 dpi is designated so long as the operator doesn't designate a desired mode in particular), the processing routine directly advances to step S6 and the operating mode of the controller is set to 300 dpi.

The controller subsequently produces the image data of the resolution set in step S3 or S6 (step S7) and outputs as an image signal (step S8).

The subsequent operations are similar to those described in the fifth embodiment. The image signal is sent to the signal processing circuit and is subjected to predetermined processes. After that, the processed image signal is sent to the printer engine and printed.

Although the above embodiment has been described with respect to the case of designating the resolution by operating the operation panel by the operator, in case of designating the resolution by a command which is supplied from a host apparatus, the resolution can be designated by executing similar operations on an application by the operator.

According to the sixth embodiment as described above, even in the case where the extension image memory is attached, the user can select the mode of 300 dpi in accordance with his taste.

According to the present invention as described above, even in the case where the printer controller has only a cheap image memory of a capacity corresponding to the data of, for instance, 300 dpi, by executing the converting process of the image signal, a smooth image of a high picture quality which can effectively use the printer engine of, for example, 600 dpi can be obtained with respect to both of a half tone image and an image of characters, figure, or the like. In case of demanding a higher picture quality, by providing an extension image memory, the image data of 600 dpi can be developed and the converting process is executed on the basis of the image data of 600 dpi, so that the image data can be printed at a higher picture quality.

What is claimed is:

1. An image processing apparatus which is connected between a recording control section of a recording apparatus and a recording mechanism section, comprising:

input means for inputting image information of a density lower than a recording density of said recording mechanism section produced by said recording control section;

memory means for storing the image information supplied from said input means by an amount of a plurality of main scan lines;

referring means for referring to said memory means for image information of a recording pixel and peripheral pixels of the recording pixel from the stored image information;

detecting means for detecting that said recording pixel and the peripheral pixels form a part of a dither half-tone pattern processed by a dither method which is constructed by a plurality of pixels as a result of the reference by said referring means;

converting means for converting the image information of the recording pixel into the image information of a density which is at least equal to or larger than a recording density of said recording mechanism section in accordance with a result of the detection by said detection means; and transmitting means for transmitting the image information converted by said converting means to said recording mechanism section.

2. An apparatus according to claim 1, wherein said converting means determines the recording density of the image information after completion of the conversion on a basis of the information of a group of pixels constructing a first half tone pattern including said recording pixel and a second half tone pattern which is different than said first half tone pattern.

3. An apparatus according to claim 1, wherein said recording mechanism section further comprises:

modulating means for modulating a light beam on a basis of the image information sent by said transmitting means;

scanning means for deflecting the light beam from said modulating means and for scanning a recording medium; and developing means for developing an electrostatic latent image formed on the recording medium by said scanning means.

4. A recording apparatus having image information producing means for producing image information of a first recording density and recording means for recording the image information onto a recording medium at a second recording density higher than said first recording density, comprising:

memory means for storing the image information of the first recording density produced by said image information producing means;

referring means for referring to said memory means for the image information of a recording pixel and peripheral pixels of the recording pixel from the stored image information;

first detecting means for detecting that said recording pixel forms a part of a dither half-tone pattern processed by a dither method which is constructed by a plurality of pixels as a result of the reference by said referring means;

first converting means for converting the image information of said recording pixel into the image information having a density which is at least equal to or larger than said second recording density in accordance with a result of the detection by said first detecting means;

second detecting means for detecting that said recording pixel forms a part of an edge of an image as a result of the reference by said referring means;

second converting means for converting the image information of the recording pixel into the image information having a density which is at least equal to or larger than the second recording density in accordance with the result of the detection by said second detecting means; and information synthesizing means for forming information to be recorded by said recording means by synthesizing the image information converted by said first converting means and the image information converted by said second converting means.

5. An apparatus according to claim 4, further comprising:

first selecting means for selecting the presence or absence of the converting process by said first converting means; and second selecting means for selecting the presence or absence of the converting process by said second converting means.

6. An apparatus according to claim 4, further comprising:

modulating means for modulating a light beam on a basis of the image information synthesized by said information synthesizing means;

scanning means for deflecting the light beam from said modulating means and for scanning the recording medium; and developing means for developing an electrostatic latent image formed on the recording medium by said scanning means.

7. A recording apparatus in which a recording density in a sub scan direction is set to a first recording density $D_1$, comprising:

a mode for converting image information supplied at a second recording density $D_2$ ($=D_1/n$) which is 1/n (where, n>1) of said first recording density $D_1$ with respect to both of a main scan and a sub scan into information in which recording densities for both of the main scan and the sub scan are n times as large as the second recording density $D_2$, namely, said recording densities are equal to the first recording density $D_1$ and for recording said converted information; and a mode for converting the image information supplied at the second recording density $D_2$ for both of the main scan and the sub scan into the information in which the density in the main scan direction of said image information is m times (m>n) as large as the second recording density $D_2$ and the density in the sub scan direction is n times as large as the second recording density $D_2$ and for recording said converted information.

8. A recording apparatus in which a recording density in a sub scan direction is set to a first recording density $D_1$, comprising:

a mode for converting image information supplied at a second recording density $D_2$ ($=D_1/n$) which is 1/n (n>1) of said first recording density $D_1$ for both of the main scan and the sub scan into information of the first recording density $D_1$, namely, whose densities are n times as large as the second recording density $D_2$ for both of the main scan and sub scan and for recording said converted information; and a mode for converting the image information supplied at the first recording density $D_1$ for both of the main scan and the sub scan into the information whose density in the main scan direction is k times (k>1) as large as the first recording density $D_1$ and for recording said converted information.

9. A recording apparatus in which a recording density in a sub scan direction is set to a first recording density $D_1$, comprising:

a mode for converting image information supplied at a second recording density $D_2$ ($=D_1/n$) which is 1/n (n>1) of said first recording density $D_1$ for both of the main scan and the sub scan into information in which the density in the main scan direction is m times (m>n) as large as the second recording density $D_2$ and the density in the sub scan direction is n times as large as the second recording density $D_2$ and for recording said converted information; and a mode for converting the image information supplied at the first recording density $D_1$ for both of the main scan and the sub scan into the information whose density in the main scan direction is k times (k>1) as large as the first recording density $D_1$ and for recording said converted information.

10. An apparatus according to any one of claims 7 or 9, wherein either one of said recording modes can be selected by a command from an operation panel or a host apparatus.

11. An apparatus according to any one of claims 7 or 9, wherein either one of the recording modes is automatically selected in accordance with the image information which is supplied.

12. An apparatus according to any one of claims 7, 8 or 9, wherein either one of the recording modes is automatically selected in accordance with a memory capacity of the image memory.

13. An apparatus according to any one of claims 7, 8 or 9, wherein said first recording density $D_1$ is equal to 600 dots per inch and said second recording density $D_2$ is equal to 300 dots per inch.

14. An apparatus according to any one of claims 7, 8 or 9, further comprising detecting means for detecting an amount of image information, and wherein even in the case where the mode to produce the image information at the first recording density $D_1$ is selected, so long as said detecting means detects that an amount of image information to be produced is larger than a predetermined value, the image information is produced at the second recording density $D_2$.

15. A recording apparatus in which a recording density in a sub scan direction is set to a first recording density $D_1$, comprising:

a mode in which image information comprises pixels, each pixel being supplied at a second recording density $D_2=D_1/n$ where n>1, is repeated n times in each of a main scan direction and the sub scan direction, thereby recording the image information at the first recording density $D_1$ for both of the main scan and the sub scan;

a mode for converting the image information supplied at the second recording density $D_2$ for both of the main scan and the sub scan into the information of the first recording density $D_1$, namely, whose densities are n times as large as the second recording density $D_2$ for both of the main scan and the sub scan for recording said converted information;

a mode for converting the image information supplied at the second recording density $D_2$ for both of the main scan and the sub scan into information in which a density in the main scan direction is m times (m>n) as large as the second recording density $D_2$ and a density in the sub scan direction is n times as large as the second recording density $D_2$ and for recording said converted information;

a mode for recording the image information supplied at the first recording density $D_1$ for both of the main scan and the sub scan; and a mode for converting the image information supplied at the first recording density $D_1$ for both of the main scan and the sub scan into information in which the density in the main scan direction is k times (k>1) as large as the first recording density $D_1$ and for recording said converted information.

16. An image processing method which is to be performed between a recording control section of a recording apparatus and a recording mechanism section, comprising:

an input step of inputting image information of a density lower than a recording density of the recording mechanism section produced by the recording control section;

a storage step of storing the image information supplied in said input step by an amount of a plurality of main scan lines;

a referring step of referring to said storage step for the image information of a recording pixel and peripheral pixels of the recording pixel from the stored image information;

a detecting step of detecting that the recording pixel and said peripheral pixels form a part of a dither half-tone pattern processed by a dither method which is constructed by a plurality of pixels as a result of a reference in said referring step;

a converting step of converting the image information of the recording pixel into the image information of a density which is at least equal to or larger than a recording density of the recording mechanism section in accordance with the result of the detection in said detecting step; and a transmitting step of transmitting the image information converted in said converting step to the recording mechanism section.

* * * * *

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

It is certified that error appears in the above-identified patent and that said Letters Patent is hereby corrected as shown below:

On the cover page, the Assignee's name is misspelled and should read --CANON KABUSHIKI KAISHA--.

Column 1, line 12, change "beam is" to --beam printer is--;
        line 15, change "spread" to --used--;
        line 27, change "an application software" to --application software stored thereon--; and
        line 34, change "only top" to --only the top--.

Column 2, line 32, change "was" to --is--; and
        line 48, change "in case" to --in the case--.

Column 3, line 20, change "into" to --to--; and
        line 54, change "imate" to --image--.

UNITED STATES PATENT AND TRADEMARK OFFICE
CERTIFICATE OF CORRECTION

PATENT NO. : 5,742,317

DATED : April 21, 1998

INVENTOR(S): Atsushi Kashihara

It is certified that error appears in the above-identified patent and that said Letters Patent is hereby corrected as shown below:

Column 4, line 9, change "takes" to --take--;
line 12, change "trasmits" to --transmits--;
line 24, delete "can";
line 30, change "into" to --to--, and change "confirmed" to --confirms--;
line 32, change "into" to --to--;
line 41, delete the second occurrence of "the";
line 42, delete "by the hand";
line 45, change "confirmed" to --confirms--;
line 47, change "into" to --to--;
line 53, change "lights" to --turns--; and
line 54, change "lights" to --turns--.

UNITED STATES PATENT AND TRADEMARK OFFICE
CERTIFICATE OF CORRECTION

PATENT NO. : 5,742,317

DATED : April 21, 1998

INVENTOR(S): Atsushi Kashihara

Page 3 of 11

It is certified that error appears in the above-identified patent and that said Letters Patent is hereby corrected as shown below:

```
        Column 5, line 5, change "whole" to --entire--;
              line 6, change "of the signal" to --of the
signals--;
              line 13, change "operates the" to
--operates keys (not shown) on the--;
              line 21, change "stores into" to --stores
the image data to--;
              line 23, change "prepared" to --stored--;
              line 33, change "from a" to --at a--;
              line 35, change "was" to --is--;
              line 40, change "every one" to --for
each--;
              line 64, change "times." to --times
higher.--.
              lines 65-66, change "When considering
application softwares," to --Accordingly, application
software,--; and
              line 67, change "dpi." to --dpi, must be
considered.--
```

UNITED STATES PATENT AND TRADEMARK OFFICE
CERTIFICATE OF CORRECTION

PATENT NO. : 5,742,317

DATED : April 21, 1998

INVENTOR(S): Atsushi Kashihara

It is certified that error appears in the above-identified patent and that said Letters Patent is hereby corrected as shown below:

```
        Column 6, line 1, delete "for 600 dpi";
                 line 2, change "manufactured," to
--manufactured for 600 dpi,--, change "cope" to --operate--,
and change "those" to --that--;
                 line 3, change both occurrences of
"softwares" to --software--;
                 line 7, change "into the" to --into--;
                 line 8, delete "of";
                 line 9, delete both occurrences of "the";
                 line 12, delete "the";
                 line 13, delete "the";
                 line 15, change "as the" to --the--, and
change "in case" to --in the case--;
                 line 20, change "outputted" to --output--;
                 line 21, change "the cheap" to --a low
cost--; and change "dpi" to --dpi,--;
                 line 25, change "in case" to --in the
case--;
                 line 29, change "of a" to --by--, and
change "a printer" to --a low cost printer--;
                 line 30, delete "cheaply";
                 line 37, change "smoothing" to
--smoothed--;
                 line 38, change "any" to --either--;
                 line 47, change "cheap" to --low cost--;
```

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

It is certified that error appears in the above-identified patent and that said Letters Patent is hereby corrected as shown below:

Column 6, line 50, change "smooth" to --smoothed--; and
           line 56, change "to a" to --for a--;

Column 7, line 56, "Mode" to --A mode--;
           line 60, change "scan," to --scan direction,--;
           line 62, change "scan " to --scan direction,--;
           line 63, change "Mode" to --A mode--; and
           line 66, change "scan," to --scan direction,--.

Column 8, line 1, change "Mode" to --A mode--;
           line 6, change "scan and" to --scan direction and--;
           line 7, change "Mode" to --A mode--;
           line 9, change "scan." to --scan direction.--;
           line 10, change "Mode" to --A mode--;
           line 14, change "scan" to --scan direction--;
           line 28, change "into" to --to--;
           lines 56-57, delete "showing an electric construction";
           line 62, change "in an" to --in the--, and change "180;" to --180 of Fig. 122;--.

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

Page 6 of 11

It is certified that error appears in the above-identified patent and that said Letters Patent is hereby corrected as shown below:

```
         Column 9, line 7, change "190;" to --190 of Fig.
122;--
              line 11, change "600x600" to --300x300--;
              line 12, change "timing chart" to --block
diagram--;
              line 16, delete "construction near a", and
change "printer;" to --printer and associated apparatus;--;
              line 37, delete both occurrences of "the";
              line 40, change "by" to --in sync with--;
              line 52, change "11" to --11 denotes--;
              line 54, change "12" to --12 denotes--;
              line 56, change "17" to --17 denotes--,
and change "18" to --18 denotes--;
              line 59, change "20" to --20 denotes--;
              line 61, change "signal and" to --signal
for--; and
              line 62, change "22" to --22 denotes--.

Column 10, line 44, delete "every"; and
                  line 45, change "inputted" to --input--.

Column 12, line 32, change "in case" to --in the
case--.

Column 13, line 21, change "outputted" to
--output--.
```

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

It is certified that error appears in the above-identified patent and that said Letters Patent is hereby corrected as shown below:

Column 14, line 5, change "blur" to --blurred--;
line 29, change "scan" to --scan directions--;
line 55, change "with" to --will--; and
line 67, change "114" to --114 denotes--.

Column 15, line 3, change "115" to --115 denotes--;
line 4, change "116" to --116 denotes--;
line 6, change "118" to --118 denotes--; and
line 57, change "outputted" to --output--.

Column 16, line 32, change "total" to --a total of--, and delete "every".

Column 17, line 7, change "got" to --obtained--;
line 8, change "Eight" to --The--, and change "the OR circuit" to --the eight OR circuits--;
line 25, change "sub scan" to --sub scan directions--;
line 44, change "to that" to --to the fact that--; and
line 61, change "matterns" to --patterns--.

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

It is certified that error appears in the above-identified patent and that said Letters Patent is hereby corrected as shown below:

Column 18, line 1, change "not limited to them." to --not so limited.--.

Column 19, line 17, change "201'." to --210.--;
        line 32, change "Even" to --Consider the case--;
        line 33, change "installed, in" to --installed and the controller 22 is supposed to operate at 600 dpi. In--;
        line 36, change "is" to --is then--;
        line 37, change "page." to --pae, rather than 600 dpi.--
        line 39, change "in which one of" to --between--;
        line 54, change "11" to --11 denotes--;
        line 56, change "12" to --12 denotes--;
        line 58, change "to 150" --denotes a--;
        line 59, change "230" to --230 denotes--; and
        line 60, change "170" to --170 denotes--, and change "180" to --180 denotes--.

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

Page 9 of 11

It is certified that error appears in the above-identified patent and that said Letters Patent is hereby corrected as shown below:

Column 20, line 28, delete "to 150";
line 51, change "supplied every" to --supplied with every--;
line 56, change "$LM_8$--" to --$LM_9$--; and
line 58, change "of total" to --of a total--.

Column 21, line 25, change "become blur" to --becomes blurred--;
line 28, change "$M_2$" to --$M_a$--; and
line 37, change "sub scan" to --sub scan directions--.

Column 22, line 50, delete "every"; and
line 64, change "taste" to --decision--.

Column 23, line 19, change "$N_{1b}$" to --$N_{1b}$ (Fig. 30)--;
line 21, change "$N_{2b}$" to $N_{2b}$ (Fib. 30)--;
line 41, change "sub scan" to --sub scan direcitons"; and
line 52, change "blur," to --blurred,--.

UNITED STATES PATENT AND TRADEMARK OFFICE
CERTIFICATE OF CORRECTION

PATENT NO. : 5,742,317
DATED : April 21, 1998
INVENTOR(S) : Atsushi Kashihara

It is certified that error appears in the above-identified patent and that said Letters Patent is hereby corrected as shown below:

```
        Column 24, line 22, change "in case" to --in the
case--;
            line 26, change "in case" to --in the
case--;
            line 33, change "as-a" to --as a--;
            line 43, change "an enough" to --a
large--;
            line 44, change "large" to --enough--;
and
            line 52, change "in case" to --in the
case--.

Column 25, line 32, change "taste." to
--decision.--; and
            line 34, change "cheap" to --low cost--.
```

UNITED STATES PATENT AND TRADEMARK OFFICE
CERTIFICATE OF CORRECTION

PATENT NO. : 5,742,317

DATED : April 21, 1998

INVENTOR(S) : Atsushi Kashihara

It is certified that error appears in the above-identified patent and that said Letters Patent is hereby corrected as shown below:

Claim 10, column 27, line 65, change "7 or 9" to --7, 8 or 9--.

Claim 11, column 28, line 1, change "7 or 9" to --7, 8 or 9--.

Signed and Sealed this

Fifteenth Day of December, 1998

Attest:

Attesting Officer

BRUCE LEHMAN

Commissioner of Patents and Trademarks